US011698597B2

(12) United States Patent
Mori

(10) Patent No.: US 11,698,597 B2
(45) Date of Patent: Jul. 11, 2023

(54) IMAGE FORMING APPARATUS

(71) Applicant: CANON KABUSHIKI KAISHA, Tokyo (JP)

(72) Inventor: Eikou Mori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/700,703

(22) Filed: Mar. 22, 2022

(65) Prior Publication Data

US 2022/0308512 A1 Sep. 29, 2022

(30) Foreign Application Priority Data

Mar. 24, 2021 (JP) .............................. JP2021-050582

(51) Int. Cl.
*G03G 15/00* (2006.01)

(52) U.S. Cl.
CPC .................................... *G03G 15/50* (2013.01)

(58) Field of Classification Search
CPC ............... G03G 15/0131; G03G 15/50; G03G 15/5062; G03G 15/55; G03G 21/046; G03G 2215/0119; G03G 2215/0161
USPC .................................. 399/72, 407
See application file for complete search history.

(56) References Cited

U.S. PATENT DOCUMENTS 7,245,842 B2 * 7/2007 Hino .................. G03G 15/0131
399/72

FOREIGN PATENT DOCUMENTS

| JP | 2005-221582 A | 8/2005 |
| JP | 2018-004954 A | 1/2018 |
| JP | 2021056262 | * 4/2021 |

OTHER PUBLICATIONS

Eikou Mori et al., U.S. Appl. No. 17/579,660, filed Jan. 20, 2022.

* cited by examiner

*Primary Examiner* — Hoan H Tran
(74) *Attorney, Agent, or Firm* — Venable LLP

(57) ABSTRACT

An image forming apparatus includes an image forming unit to form an image on a sheet, a conveyance unit to convey the sheet having the image formed thereon to a conveyance path and a reading unit to read a test image of a sheet conveyed to the conveyance path. In addition, a controller determines an adjustment value for adjusting a geometric characteristic of an image to be formed by the image forming unit based on a reading result of the reading unit, controls the image forming unit to form the test image, controls the reading unit to read the sheet having the test image formed thereon, and determines an adjustment value for adjusting a geometric characteristic of an image to be formed by the image forming unit based on a reading result of the reading unit.

20 Claims, 15 Drawing Sheets

1001

| PRINT JOB LIBRARY | | | | |
|---|---|---|---|---|
| NAME | SIZE | PAGE | |
| JOB No. 1 | A3 | 1 | △ |
| JOB No. 2 | A4 | 1 | |
| JOB No. 3 | A4 | 1 | |
| JOB No. 4 | A3 | 1 | |
| JOB No. 5 | A3 | 2 | |
| JOB No. 6 | A3 | 1 | ▽ |

[ ADD NEW JOB ] [ EDIT ] [ DELETE ] [ ADJUST PRINTING POSITION ] 1002

FIG. 7A

<ADJUST PRINTING POSITION:SELECT CORRECTION METHOD>

○ ADJUST BY READING AN ADJUSTMENT SHEET EVERY PREDETERMINED NUMBER OF SHEETS — 1105

● ADJUST BY CONSTANTLY READING AN ADJUSTMENT SHEET — 1106

FIG. 7B

IMAGE FORMING APPARATUS

BACKGROUND OF THE INVENTION

Field of the Invention

The present disclosure relates to an image forming apparatus, for example, a copying machine, a multifunction peripheral, and a printer.

Description of the Related Art

In recent years, the market for on-demand image forming apparatus is expanding. For example, in an offset printing market, electrophotographic image forming apparatus are becoming widespread. Image forming apparatus employing an inkjet system, which have succeeded in cultivating a wide market for reasons such as a large format, a low initial cost, and an extremely high speed, are also expanding its share in the market for on-demand image forming apparatus. However, expansion of the market is not easy, and an image forming apparatus must maintain quality of images (hereinafter referred to as "image quality") of preceding image forming apparatus that have served the market. In order to maintain the image quality, an image forming condition to be used when the image forming apparatus forms an image on a sheet is appropriately corrected.

The image quality includes a tone characteristic, granularity, in-plane evenness, letter quality, and color reproducibility (including color stability). As another important factor of the image quality, there is "front/back registration accuracy." The front/back registration accuracy refers to accuracy in registration of images on a front surface and a back surface of a sheet. A deviation between positions (printing positions) of images on the front surface and the back surface of a sheet (printed product) on which the images have been formed is called "front/back misregistration." With offset printing machines, the front/back registration accuracy is adjusted by a skilled technician before printing, and the front/back misregistration is suppressed to from about 0.1 to about 0.2. However, the adjustment of the front/back registration accuracy requires time and requires proficient skills.

An electrophotographic image forming apparatus using toner is widely known as a digital printing apparatus that satisfies the needs for high-mix low-volume printing. The image forming apparatus fixes the toner to the sheet by heat and pressure. Therefore, for example, the sheet shrinks after printing on the first surface. This causes print misregistration between the first surface and the second surface, that is, front/back misregistration. In addition, an image forming apparatus that handles cut sheets including the above-mentioned electrophotographic image forming apparatus provides high-precision printing position stability by way of registration of the sheet. Normally, the registration is performed with one side of a rectangular sheet being used as a reference, and hence variations in the front/back registration accuracy for each sheet is affected by the cutting accuracy of the sheet and the deformation of the sheet.

Factors that determine the cutting accuracy of the sheet and the sheet shape including the deformation of the sheet include perpendicularity and parallelism in addition to the length of each side of the sheet. The shape of the sheet varies depending on a difference in sheet cutting between lots and the surrounding environment. The front/back registration accuracy is affected by the shape of the sheet. Therefore, in order to provide the front/back registration accuracy equivalent to that of offset printing in the image forming apparatus that handles cut sheets, an adjustment of geometric characteristics such as the printing position, magnification, and distortion is required every time the sheet cutting lot or circumstance environment changes. The front/back deviation is adjusted by adjusting the geometric characteristics. Such work is called "front/back registration."

Japanese Patent Application Laid-open No. 2018-004954 discloses an image forming apparatus for calculating an adjustment amount of a printing position. This image forming apparatus repeatedly reads a sheet on which a test image has been printed to calculate the adjustment amount of the print position using only a reading result in which a fluctuation amount of a position of the test image caused by variations in conveying the sheet during reading is equal to or less than a threshold value. Japanese Patent Application Laid-open No. 2005-221582 discloses an image forming apparatus that automatically interrupts and executes a printing position adjustment at a predetermined number of printing intervals during a job.

Due to differences in surface properties (embossed paper, label paper, etc.) of the sheet, erroneous detection of the reading result of the test image occurs. The erroneously detected reading result may affect the calculation of the accurate adjustment value. Therefore, it is necessary to exclude the erroneously detected reading result as abnormal data. Conventionally, by reading the test image a plurality of times and selecting the reading result that is equal to or less than a threshold value, the reading error of the reading result used for calculating the adjustment value is reduced. However, in a case where only the reading results equal to or less than the threshold value are used, the number of samples of the reading results used for calculating the adjustment amount is reduced. Therefore, the number of samples for image shape errors and paper shape errors between pages is reduced, as a result, the adjustment accuracy of geometric characteristics such as image position adjustment is lowered. Therefore, the present disclosure provides an image forming apparatus that suppresses, to form an image, a decrease in the adjustment accuracy of geometric characteristics due to the reduced number of samples.

SUMMARY OF THE INVENTION

An image forming apparatus according to the present disclosure includes: an image forming unit configured to form an image on a sheet; a conveyance unit configured to convey the sheet having the image formed thereon to a conveyance path; a reading unit configured to read a test image of a sheet conveyed to the conveyance path; and a controller configured to: determine an adjustment value for adjusting a geometric characteristic of an image to be formed by the image forming unit based on a reading result of the reading unit; control the image forming unit to form the test image; control the reading unit to read the sheet having the test image formed thereon; determine an adjustment value for adjusting a geometric characteristic of an image to be formed by the image forming unit based on a reading result of the reading unit; and control the geometric characteristic of the image formed by the image forming unit based on the adjustment value, wherein the controller is configured to determine abnormal data from the reading result of the reading unit, and determine the adjustment value based on a specified number of the reading results except for the reading result determined to be the abnormal data.

Further features of the present invention will become apparent from the following description of exemplary embodiments (with reference to the attached drawings).

BRIEF DESCRIPTION OF THE DRAWINGS

FIG. 7A and FIG. 7B are exemplary views of an operation screen.

DESCRIPTION OF THE EMBODIMENTS

Now, an embodiment of the present disclosure is described with reference to the accompanying drawings. In this embodiment, a method of solving the above-mentioned problems through use of an electrophotographic laser beam printer is described. The description is given by taking an electrophotographic system as an example, but in regard to the feature points of control, in particular, the matters described in the appended claims, there are similar problems due to image fixing of a heat-drying method even in an inkjet printer and a dye-sublimation printer, and those problems can be solved through use of the method described below. Therefore, it is claimed that the above-mentioned claims are also within the scope of the claims even in each type of image forming apparatus.

<Image Forming Apparatus>

Figure 1:
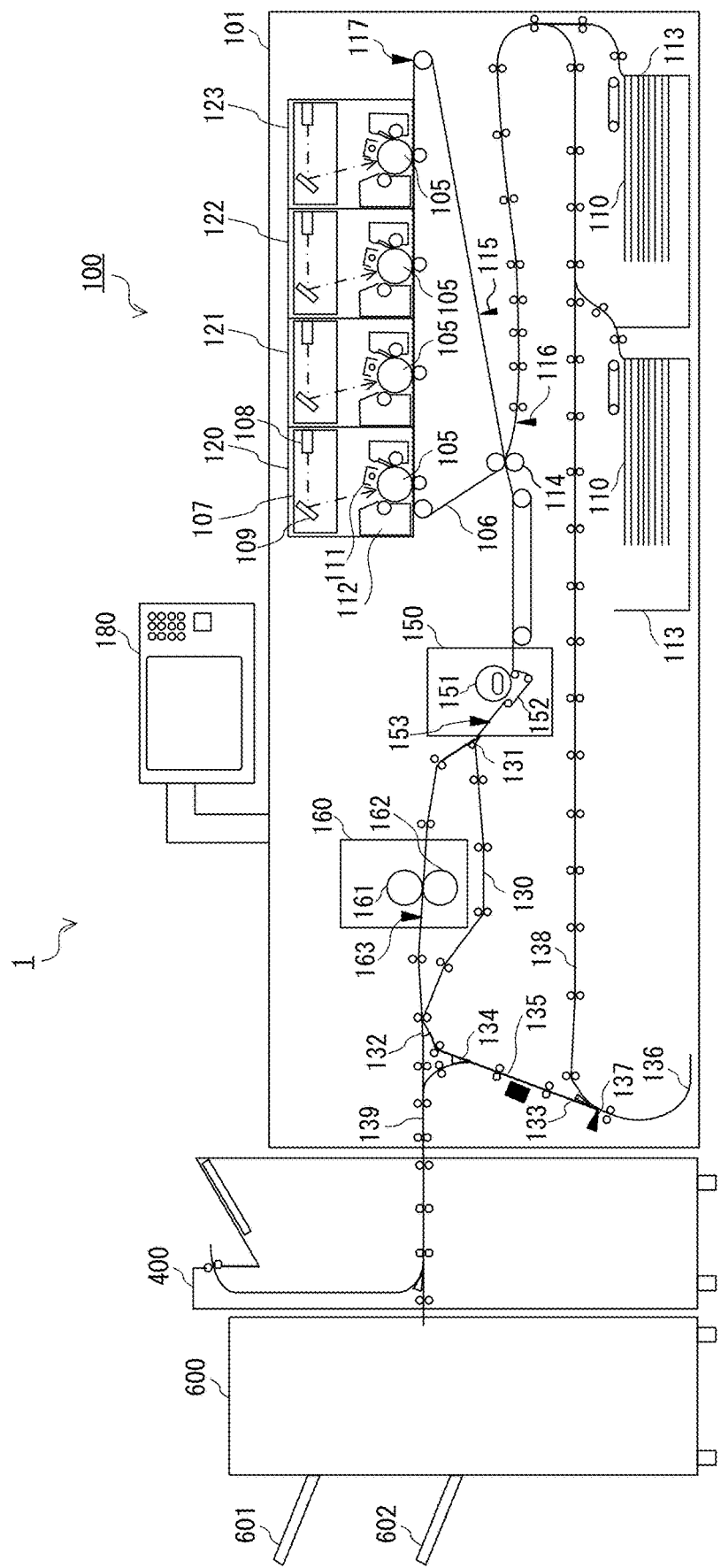
FIG. 1 is a configuration view of an image forming apparatus according to an embodiment of the present disclosure.

FIG. 1 is a configuration view of an image forming apparatus according to this embodiment. An image forming apparatus 1 according to this embodiment includes a printer 100, an adjustment unit 400, and a finisher 600. The printer 100 employs an electrophotographic system to form an image onto a sheet 110. The printer 100 in this embodiment may be an inkjet printer or a dye-sublimation printer.

The printer 100 includes, inside a casing 101, mechanisms which form an engine unit for use in image formation, and a controller to be described later. The controller controls operations of the mechanisms. An operation panel 180 is provided in an upper portion of the casing 101. The operation panel 180 is a user interface, and includes an input device for receiving instructions from a user, and an output device for displaying a screen, for example, an operation screen. The mechanisms which form the engine unit include a mechanism (image forming mechanism) for forming an image, a mechanism (transfer mechanism) for transferring the image onto the sheet 110, a mechanism (feeding mechanism) for feeding the sheet 110, and a mechanism (fixing mechanism) for fixing the image to the sheet 110.

The image forming mechanism includes four image forming units 120, 121, 122, and 123 corresponding respective colors of yellow (Y), magenta (M), cyan (C), and black (K). The image forming units 120, 121, 122, and 123 form images of corresponding colors. The image forming units 120, 121, 122, and 123 have the same configuration, but differ only in color of an image to be formed. Description is given here of the configuration of the image forming unit 120, and description of the configurations of the other image forming units 121, 122, and 123 is omitted.

The image forming unit 120 includes a photosensitive drum 105, a charging device 111, a laser scanner 107, and a developing device 112. The photosensitive drum 105 is a drum-shaped photosensitive member having a charging layer on its surface, and is configured to rotate about a drum shaft. The charging device 111 uniformly charges the surface of the rotating photosensitive drum 105. The laser scanner 107 scans the photosensitive drum 105 with laser light modulated based on image data representing an image to be formed. The laser scanner 107 includes a light emitting portion 108 for scanning the laser light emitted from a semiconductor laser in one direction (drum axis direction), and a reflective mirror 109 for reflecting the laser light emitted from the light emitting portion 108 toward the photosensitive drum 105. A direction in which the laser scanner 107 scans the photosensitive drum 105 (depth direction of FIG. 1) corresponds to a main scanning direction.

When the photosensitive drum 105 is charged and scanned with the laser light, an electrostatic latent image corresponding to the image data is formed on its surface. The developing device 112 develops the electrostatic latent image formed on the photosensitive drum 105 with developer. In this manner, a visible image of the electrostatic latent image is formed on the surface of the photosensitive drum 105. On the photosensitive drum 105 of the image forming unit 120, a yellow image is formed. On the photosensitive drum 105 of the image forming unit 121, a magenta image is formed. On the photosensitive drum 105 of the image forming unit 122, a cyan image is formed. On the photosensitive drum 105 of the image forming unit 123, a black image is formed. The photosensitive drum 105 and the developing device 112 are removable from the casing 101.

The transfer mechanism includes an intermediate transfer member 106 and transfer rollers 114. Onto the intermediate transfer member 106, images are sequentially transferred in superimposition from the photosensitive drums 105 of the respective image forming units 120, 121, 122, and 123. In this embodiment, the intermediate transfer member 106 is configured to rotate in the clockwise direction of FIG. 1, and images are transferred in order of the image forming unit 120 (yellow), the image forming unit 121 (magenta), the image forming unit 122 (cyan), and the image forming unit 123 (black). An image density detection sensor 117 is provided on the downstream of the image forming unit 123 in the rotating direction of the intermediate transfer member 106. The image density detection sensor 117 detects an image density from an image for image density detection formed on the intermediate transfer member 106.

The images transferred onto the intermediate transfer member 106 are conveyed to reach the transfer rollers 114 by rotation of the intermediate transfer member 106. An image formation start position detection sensor 115 is provided on the upstream of the transfer rollers 114 in the rotating direction of the intermediate transfer member 106. The image formation start position detection sensor 115 is used to determine a transfer position for transfer onto the sheet 110. The transfer rollers 114 bring the sheet 110 into pressure-contact with the intermediate transfer member 106, and are to be applied with a bias having an opposite characteristic to that of an image formed on the intermediate transfer member 106. Thus, the images are transferred onto the sheet 110 from the intermediate transfer member 106.

The feeding mechanism includes a sheet feeding cassette 113 for storing the sheet 110, a conveyance path through which the sheet 110 is to be fed, and various rollers for conveying the sheet 110 through the conveyance path. The sheet 110 is fed from the sheet feeding cassette 113, conveyed through the conveyance path so that the images are transferred and fixed to be formed thereon, and is discharged to the outside of the casing 101. In this embodiment, a plurality of sheet feeding cassettes 113 are provided, and the sheet can be fed from any one of the sheet feeding cassettes 113. The sheets 110 received in the respective sheet feeding cassettes 113 may be sheets of the same type, but may be sheets of different types.

The sheet 110 is first fed from the sheet feeding cassette 113, and is then conveyed through the conveyance path to reach the transfer rollers 114. A sheet feeding timing sensor 116 is provided in the middle of the conveyance path from the sheet feeding cassette 113 to the transfer rollers 114. The sheet feeding timing sensor 116 is used to adjust the timing to convey the sheet 110. The timing to convey the sheet 110 to the transfer rollers 114 is adjusted based on the timing at which the image formation start position detection sensor 115 detects the images formed on the intermediate transfer member 106 and the timing at which the sheet feeding timing sensor 116 detects the sheet 110. In this manner, the images are transferred onto a predetermined position of the sheet 110 from the intermediate transfer member 106.

The sheet 110 having the images transferred thereon is conveyed to the fixing mechanism. The fixing mechanism in this embodiment includes a first fixing device 150 and a second fixing device 160. The first fixing device 150 includes a fixing roller 151, a pressure belt 152, and a post-fixing sensor 153. The fixing roller 151 heats the sheet 110 in order to thermally pressure-fix the images onto the sheet 110. The pressure belt 152 is used to bring the sheet 110 to pressure contact with the fixing roller 151. The post-fixing sensor 153 detects that the fixing is finished. The fixing roller 151 is a hollow roller, and includes therein a heater. The fixing roller 151 is configured to rotate to convey the sheet 110. The post-fixing sensor 153 detects the sheet 110 subjected to image fixing.

The second fixing device 160 is arranged on the downstream with respect to the first fixing device 150 in the conveying direction of the sheet 110, and is used to add gloss to the image formed on the sheet 110 subjected to fixing processing by the first fixing device 150 or to ensure the fixing performance. The second fixing device 160 includes a fixing roller 161, a pressure roller 162, and a post-fixing sensor 163. The fixing roller 161 has a configuration similar to that of the fixing roller 151, and functions similarly to the fixing roller 151. The pressure roller 162 functions similarly to the pressure belt 152. The post-fixing sensor 163 functions similarly to the post-fixing sensor 153. The second fixing device 160 performs fixing processing to the sheet 110 similarly to the first fixing device 150.

The second fixing device 160 may not be used depending on the type of the sheet 110 and the content of the image formation processing. A conveyance path 130 is provided in order to convey the sheet 110 subjected to fixing processing by the first fixing device 150 without causing the sheet 110 to pass through the second fixing device 160. Accordingly, a flapper 131 is provided on the downstream of the first fixing device 150 in the conveying direction of the sheet 110. The flapper 131 is used to guide the sheet 110 to any one of the second fixing device 160 and the conveyance path 130.

The sheet 110 that has passed through any one of the second fixing device 160 and the conveyance path 130 is discharged as it is in some cases, and is conveyed to a conveyance path 135 in other cases. Accordingly, a flapper 132 is provided at a position after a junction between a conveyance path following the second fixing device 160 and the conveyance path 130. The flapper 132 is used to guide the sheet 110 to any one of the conveyance paths 135 and a discharge path 139. The sheet 110 guided to the discharge path 139 is discharged to the outside of the casing 101 with its surface having the image formed thereon (first surface) facing upward.

The conveyance path 135 is a path for conveying the sheet 110 to a reverse path 136 to be used for reversing the front and back surfaces of the sheet 110. A reverse sensor 137 for detecting the sheet 110 is provided in the reverse path 136. When the reverse sensor 137 detects the trailing edge portion of the sheet 110, the conveying direction of the sheet 110 is reversed in the reverse path 136. The sheet 110 whose conveying direction is reversed is conveyed to any one of the conveyance paths 135 and a reverse path 138. Accordingly, a flapper 133 is provided at a branch of the conveyance path 135 and the reverse path 138. When being conveyed along the conveyance path 135, the sheet 110 is guided by the flapper 133 to the conveyance path 135, and is discharged to the outside of the casing 101 with its front and back surfaces being reversed (surface having the image formed thereon facing downward). When being conveyed to the reverse path 138, the sheet 110 is guided by the flapper 133 to the reverse path 138. The sheet 110 guided to the reverse path 138 is conveyed to the transfer rollers 114 again with its front and back surfaces being reversed. In this manner, image formation is performed on the back surface (second surface) of the sheet 110.

<Adjustment Unit>

Figure 2:
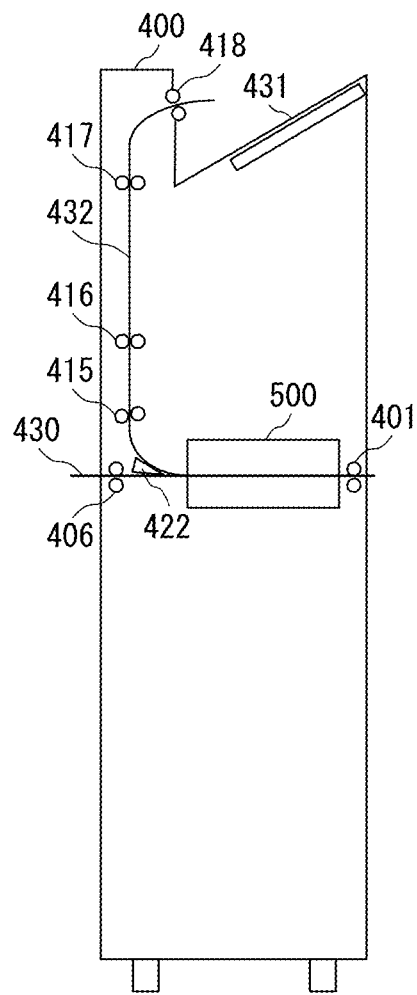
FIG. 2 is a configuration view of an adjustment unit.

FIG. 2 is a configuration view of the adjustment unit 400. The adjustment unit 400 is provided at the subsequent stage of the printer 100, and receives the sheet 110 subjected to image formation and discharged from the printer 100. The adjustment unit 400 includes two conveyance paths of a through-path 430 and a discharge path 432. A branch flapper 422 is provided at a branch point between the through-path 430 and the discharge path 432. In the through-path 430, a reading unit 500 is provided on the upstream side of the branch flapper 422 in the conveying direction of the sheet 110. The reading unit 500 reads an image formed on the sheet 110 received from the printer 100.

In the through-path 430, conveyance rollers 401, the reading unit 500, the branch flapper 422, and discharge rollers 406 are provided in the stated order from the upstream side in the conveying direction of the sheet 110. In the discharge path 432, conveyance rollers 415, 416, and 417 and discharge rollers 418 are provided with the branch flapper 422 being set as a base point. When the sheet 110 passes through the through-path 430, the branch flapper 422 moves to an upper position. The sheet 110 that has passed through the through-path 430 is discharged from the adjustment unit 400 to the outside (finisher 600) by the discharge rollers 406. The finisher 600 discharges the sheet 110 to a tray 601 or a tray 602 (see FIG. 1). The finisher 600 may subject the sheet 110 to post-processing, for example, staple processing, and bookbinding processing. When the sheet 110 is conveyed to the discharge path 432, the branch flapper 422 moves to a lower position. The sheet 110 conveyed to the discharge path 432 is discharged to a fixed tray 431 by the discharge rollers 418.

In this manner, the discharge destination of the sheet 110 can be switched by the branch flapper 422. The sheet 110 to be conveyed to the finisher 600 passes through the through-path 430. The sheet 110 to be used for front/back registration has an image read by the reading unit 500, and the sheet 110 is discharged to the fixed tray 431 through the discharge path 432. The sheet 110 on which an image is formed based on a job may be referred to as "job sheet," and the sheet 110 to be used for the front/back registration may be referred to as "adjustment sheet." The job sheet is conveyed to the finisher 600 through the through-path 430.

It is possible to prevent the adjustment sheet from being mixed between the job sheets by discharging the job sheet and the adjustment sheet separately from each other. No adjustment sheet is required for the user. When the adjustment sheet is mixed between the job sheets, work for removing the adjustment sheet occurs. Therefore, it is effective to discharge the job sheet and the adjustment sheet separately from each other in order to improve the efficiency of user work.

<Reading Unit>

Figure 3A:
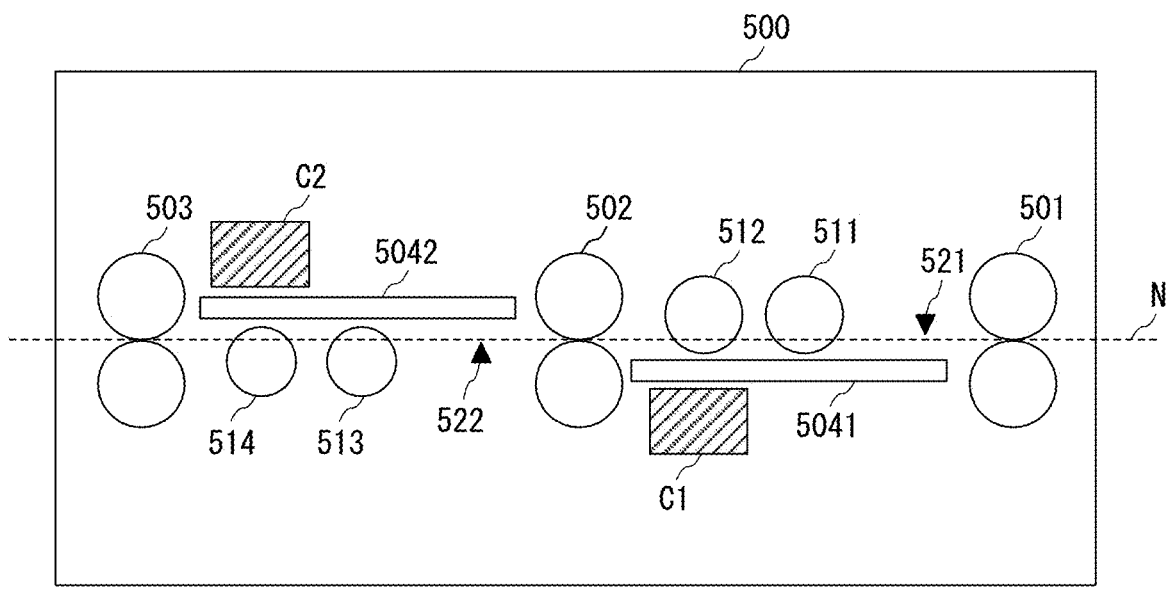
FIG. 3A and FIG. 3B are explanatory views of a reading unit.
Figure 3B:
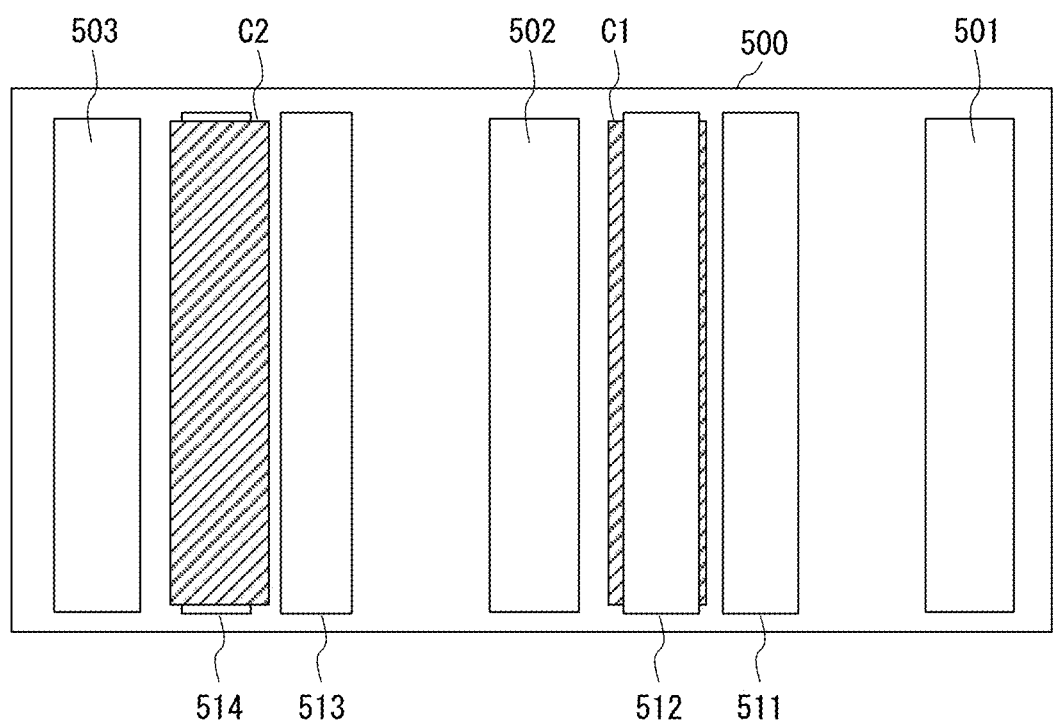

FIG. 3A and FIG. 3B are explanatory views of the reading unit 500. FIG. 3A is a cross-sectional view of the reading unit 500. FIG. 3B is a top view of the reading unit 500. The reading unit 500 includes conveyance rollers 501, 502, and 503, reading sensors C1 and C2, glasses 5041 and 5042, bias rollers 511, 512, 513, and 514, and sheet detection sensors 521 and 522.

The conveyance rollers 501, 502, and 503 convey the sheet 110. The sheet 110 is conveyed through the conveyance roller 501, the conveyance roller 502, and the conveyance roller 503 in the stated order. The reading sensors C1 and C2 detect an edge portion of the sheet 110 being conveyed, and read the printed image. The reading sensors C1 and C2 are optical sensors, for example, contact image sensors (CISes). The reading sensor C1 reads an image on the back surface of the sheet 110. The reading sensor C2 reads an image on the front surface of the sheet. The reading sensors C1 and C2 continuously read images line by line with a direction perpendicular to the conveying direction of the sheet 110 being used as a main scanning direction. The conveying direction of the sheet 110 is used as a sub-scanning direction.

The sheet detection sensors 521 and 522 detect the sheet 110 being conveyed. An operation timing of the reading sensor C1 is determined based on a timing at which the sheet detection sensor 521 detects the sheet 110. An operation timing of the reading sensor C2 is determined based on the timing at which the sheet detection sensor 522 detects the sheet 110. The sheet detection sensor 521 may be arranged at any position between an inlet through which the adjustment unit 400 receives the sheet 110 from the printer 100 and a reading position of the reading sensor C1. The sheet detection sensor 522 may be arranged at any position between the reading position of the reading sensor C1 and a reading position of the reading sensor C2. The operation timing of the reading sensor C2 may also be determined based on the timing at which the sheet detection sensor 521 detects the sheet without providing the sheet detection sensor 522.

The reading sensor C1 irradiates the sheet 110 being conveyed with light through the glass 5041, and receives the reflected light through the glass 5041, to thereby detect the edge portion of the sheet 110 and read the image. The bias rollers 511 and 512 are arranged so as to face the reading sensor C1, and bias the sheet 110 toward the reading sensor C1 side. The bias rollers 511 and 512 are arranged with a predetermined gap from the glass 5041. That is, the bias rollers 511 and 512 and the glass 5041 do not contribute to the formation of a nip. The bias rollers 511 and 512 cross a nip line N connecting nip portions of the conveyance rollers 501, 502, and 503 toward the glass 5041 side. Thus, the sheet 110 passes through a position closer to the glass 5041, that is, near a focus position of the reading sensor C1. When the reading sensor C1 is a CIS, the depth of focus of the CIS is small, and hence it is required to bias the sheet 110 toward a position near the focus position of the reading sensor C1.

The reading sensor C2 irradiates the sheet 110 being conveyed with light through the glass 5042, and receives the reflected light through the glass 5042, to thereby detect the edge portion of the sheet 110 and read the image. The bias rollers 513 and 514 are arranged so as to face the reading sensor C2, and bias the sheet 110 toward the reading sensor C2 side. The bias rollers 513 and 514 are arranged with a predetermined gap from the glass 5042. That is, the bias rollers 513 and 514 do not form a nip with the glass 5042. The bias rollers 513 and 514 cross the nip line N toward the glass 5042 side. Thus, the sheet 110 passes through a position closer to the glass 5042, that is, near a focus position of the reading sensor C2. When the reading sensor C2 is a CIS, the depth of focus of the CIS is small, and hence it is required to bias the sheet 110 toward a position near the focus position of the reading sensor C2.

The reading unit 500 having such a configuration can read the edge portion of the sheet 110 and the image formed on the sheet 110 while conveying the sheet 110 by the conveyance rollers 501, 502, and 503. A distance from the edge portion of the sheet 110 to the image is detected based on a reading result obtained by the reading unit 500. The distance from the edge portion of the sheet 110 to the image is used to perform geometric adjustment, for example, adjustment of a formation position (printing position) of the image on the sheet 110. The components of the reading sensor C1, the glass 5041, and the bias rollers 511 and 512 may be reversed from the components of the reading sensor C2, the glass 5042, and the bias rollers 513 and 514 in terms of the arrangement. That is, the components of the reading sensor C2, the glass 5042, and the bias rollers 513 and 514 may be arranged on the upstream side, and the components of the reading sensor C1, the glass 5041, and the bias rollers 511 and 512 may be arranged on the downstream side.

<Adjustment Sheet>

Figure 4:
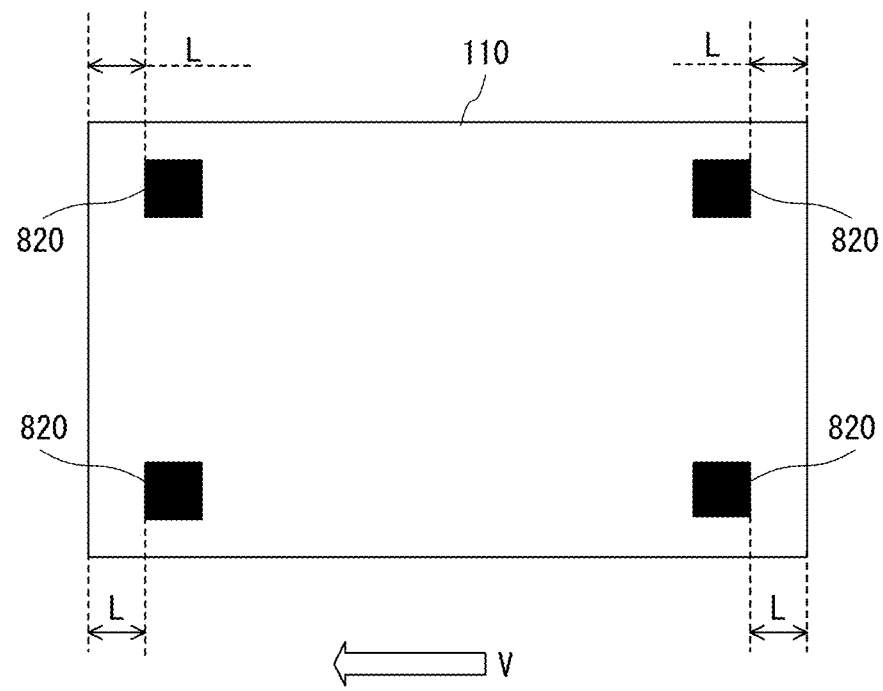
FIG. 4 is an explanatory view of an adjustment sheet used for interruption adjustment.

In the case of an interruption adjustment in which the geometric characteristics are adjusted by interruption during a print job, the test chart illustrated in FIG. 4 is used. FIG. 4 is an explanatory view of the sheet 110 (adjustment sheet) to be used for the interruption adjustment. The adjustment sheet is created by printing a test image formed of four patch images 820 in the vicinity of the four vertices of the sheet 110. The patch image 820 on the leading edge side of the sheet 110 in the conveying direction is printed at a position at which the distance from the leading edge portion of the sheet 110 in the conveying direction is L. The patch image 820 on the trailing edge side of the sheet 110 in the conveying direction is printed at a position at which the distance from the trailing edge portion of the sheet 110 in the conveying direction is L. When the conveying speed of the sheet 110 is represented by V, a timing at which the reading sensor detects an edge portion of the sheet is represented by T1, and a timing at which the reading sensor detects an edge portion of the patch image 820 edge portion is represented by T2, the distance L is expressed as L=(T2−T1)*V. In this case, any one of the reading sensor C1 or the reading sensor C2 can be used as the reading sensor.

Figure 5:
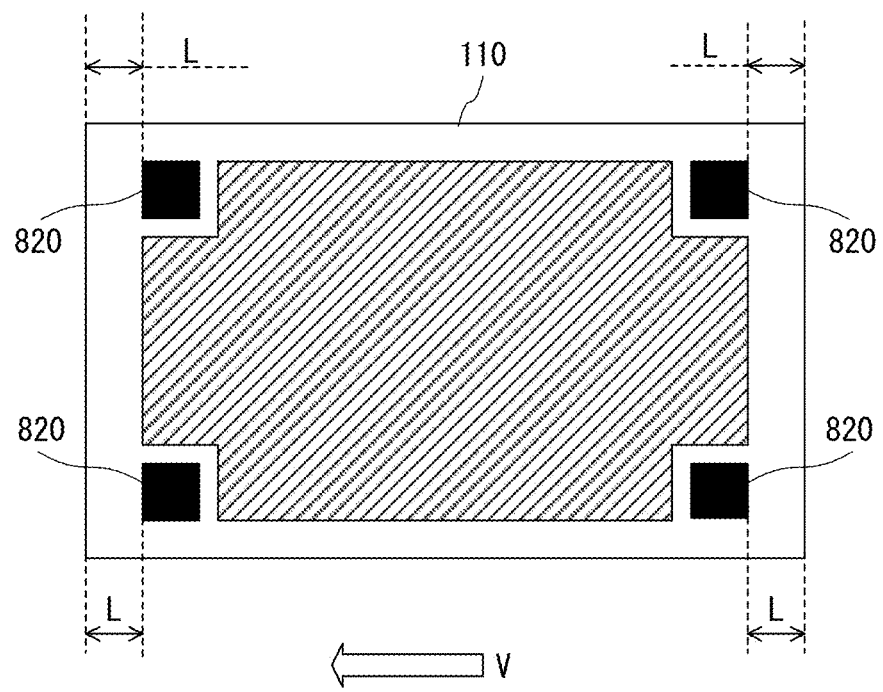
FIG. 5 is an explanatory view of an adjustment sheet used for real-time adjustment.

In the case of a real-time adjustment in which the geometric characteristics are constantly adjusted, the test chart illustrated in FIG. 4 is used. FIG. 5 is an explanatory view of the sheet 110 (adjustment sheet) to be used for the real-time adjustment. On the adjustment sheet, the patch images 820 are formed at the same position as the adjustment sheet used for the interruption adjustment in FIG. 4. Thus, the adjustment sheet is created by printing a test image formed of four patch images 820 in the vicinity of the four vertices of the sheet 110. The shadow area is an area in which an image corresponding to the print job is formed. That is, in the adjustment sheet used for real-time adjustment, the patch image 820 is formed on the job sheet in which the image is formed according to the print job.

The patch image 820 on the leading edge side of the sheet 110 in the conveying direction is printed at a position at which the distance from the leading edge portion of the sheet 110 in the conveying direction is L. The patch image 820 on the trailing edge side of the sheet 110 in the conveying direction is printed at a position at which the distance from the trailing edge portion of the sheet 110 in the conveying direction is L. The distance L is referred to as L=(T2−T1)/V.

<Controller>

Figure 6:
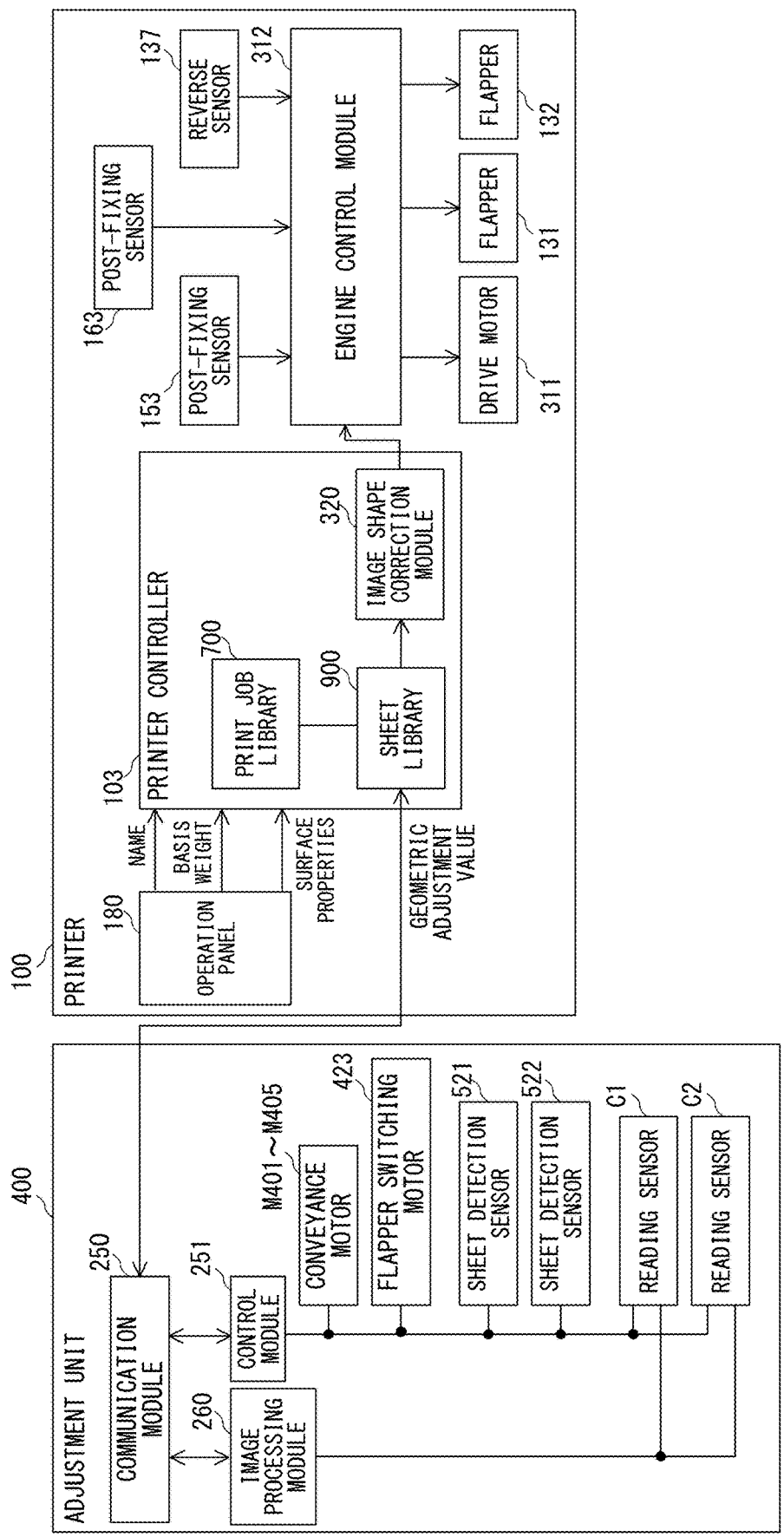
FIG. 6 is an explanatory diagram of a controller.

FIG. 6 is an explanatory diagram of a controller for controlling an operation of the image forming apparatus 1. The printer 100 includes a printer controller 103 and an engine control unit 312. The printer controller 103 comprehensively controls the operation of the image forming apparatus 1. The engine control unit 312 controls image forming processing on the sheet 110 by controlling an operation of each of the mechanisms which form the engine unit for use in the image formation.

The printer controller 103 is connected to the operation panel 180, and acquires, for example, instructions input from the operation panel 180 to cause the operation panel 180 to display various screens including such operation screens as illustrated as examples in FIG. 7A and FIG. 7B. The printer controller 103 includes a print job library 700, a sheet library 900, and an image shape correction unit 320. The print job library 700 and the sheet library 900 are linked to each other. In this case, for example, a print job including image data transferred from a personal computer, which is an external device, is stored in the print job library 700. In the following description, an image formed by the image forming apparatus 1 based on the print job is referred to as a "user image." The user image is an image different from the test image determined in advance.

The print job library 700 stores print jobs input from the operation panel 180. The print job library 700 stores, for each of the print jobs, information including the dimensions (sheet size) of the sheet to be used for printing and the number of pages to be printed. The sheet library 900 stores information including geometric characteristics of an image to be formed on a sheet for each type of sheet that can be used by the printer 100. The information on the geometric characteristics of an image to be formed on the sheet is updated based on geometric adjustment values acquired from the adjustment unit 400 as described later. The information stored in the sheet library 900 also includes information including the name, basis weight, and surface properties of the sheet that are input from the operation panel 180. The image shape correction unit 320 acquires the information on the geometric characteristics of the sheet to be used in the print job from the sheet library 900. The image shape correction unit 320 controls, for the image data, the image shape, printing position, and other geometric characteristics of an image to be formed on the sheet based on the acquired information on the geometric characteristics. The image data corrected by the image shape correction unit 320 is transmitted to the engine control unit 312.

Post-fixing sensors 153 and 163, a reverse sensor 137, flappers 131 and 132, a drive motor 311, and other components are connected to the engine control unit 312. The drive motor 311 is a drive source for driving various rollers for conveying the sheet 110 in the printer 100. The engine control unit 312 forms an image onto the sheet 110 by each mechanism of the engine unit in accordance with a print instruction including image data, which is given by the printer controller 103. At this time, the engine control unit 312 performs conveyance control on the sheet 110 by controlling operations of the flappers 131 and 132, the drive motor 311, and other components based on detection results obtained by the sensors including the post-fixing sensors 153 and 163 and the reverse sensor 137.

The adjustment unit 400 is connected to the printer 100 so as to enable communication therebetween. The adjustment unit 400 includes a communication unit 250, a control unit 251, and an image processing part 260. Conveyance motors M401 to M405, a flapper switching motor 423, the sheet detection sensors 521 and 522, and the reading sensors C1 and C2 are connected to the control unit 251. The reading sensors C1 and C2 are connected to the image processing part 260.

The communication unit 250 is a communication interface with respect to the printer 100 (printer controller 103). The communication unit 250 receives data from the printer controller 103 to transmit the data to the control unit 251 and the image processing part 260. The communication unit 250 receives data from the control unit 251 and the image processing part 260 to transmit the data to the printer controller 103. For example, the communication unit 250 receives an operation instruction from the printer controller 103 to transmit the operation instruction to the control unit 251, and acquires a geometric adjustment value described later from the image processing part 260 to transmit the geometric adjustment value to the printer controller 103.

The control unit 251 operates in accordance with the operation instruction acquired from the printer controller 103 to control operations of the conveyance motors M401 to M405, the flapper switching motor 423, and the reading sensors C1 and C2. The conveyance motors M401 to M405 are drive sources for the conveyance rollers 401, 415, 416, 417, 501, 502, and 503, the discharge rollers 406 and 418, and the bias rollers 511, 512, 513, and 514 which are included in the adjustment unit 400. The conveyance motors M401 to M405 convey the sheet 110 by driving and controlling those rollers in accordance with the instructions given by the control unit 251.

The flapper switching motor 423 performs switching control on the branch flapper 422 in accordance with the instruction given by the control unit 251. The operation instruction acquired from the printer controller 103 by the control unit 251 includes information indicating whether the image formed on the delivered sheet 110 is a user image corresponding to the print job or a test image. When the user image corresponding to the print job is formed on the delivered sheet 110 (in the case of a job sheet), the control unit 251 causes the flapper switching motor 423 to move the branch flapper 422 to the upper position. When a test image is formed on the delivered sheet 110 (in the case of an adjustment sheet), the control unit 251 causes the flapper switching motor 423 to move the branch flapper 422 to the lower position. In a case where the user image and the test image corresponding to the print job are formed on the delivered sheet 110, the control unit 251 moves the branch flapper 422 to the upper position by the flapper switching motor 423.

The reading sensors C1 and C2 each read an image from the sheet 110 in accordance with the instruction given by the control unit 251. When the delivered sheet is an adjustment sheet, or when the user image and the test image are formed on the delivered sheet, the control unit 251 instructs the reading sensors C1 and C2 to read the image. The control unit 251 is also connected to the sheet detection sensors 521 and 522, and instructs each of the reading sensors C1 and C2 to read the image formed on the sheet 110 based on a timing at which each of the sheet detection sensors 521 and 522 detects the sheet 110. The reading sensors C1 and C2 each transmit a reading result of the sheet 110 to the image processing part 260.

The image processing part 260 operates in accordance with the instruction acquired from the printer controller 103, and generates geometric adjustment values for adjusting the geometric characteristics of an image to be formed by the printer 100 based on the reading results of the sheet 110 obtained by the reading sensors C1 and C2. Examples of the geometric characteristics include the shape and printing position of an image to be formed on the sheet 110. The image processing part 260 stores the generated geometric adjustment values in the sheet library 900 of the printer controller 103 through the communication unit 250.

Processing for adjusting the geometric characteristics by the controller of the image forming apparatus 1 as described above is described. In this case, a case in which the printing position is adjusted as a geometric characteristic is described. In the case of the interruption adjustment, the geometric characteristic is adjusted by forming images on the sheets 110 of a predetermined number. That is, the geometric characteristic is periodically adjusted, by interrupting the printing job, every time the number of sheets 110 passed in the image forming apparatus 1 reaches the predetermined number. In the case of the real time interruption adjustment, the geometric characteristic is adjusted by forming images on the sheets 110.

Figure 8:
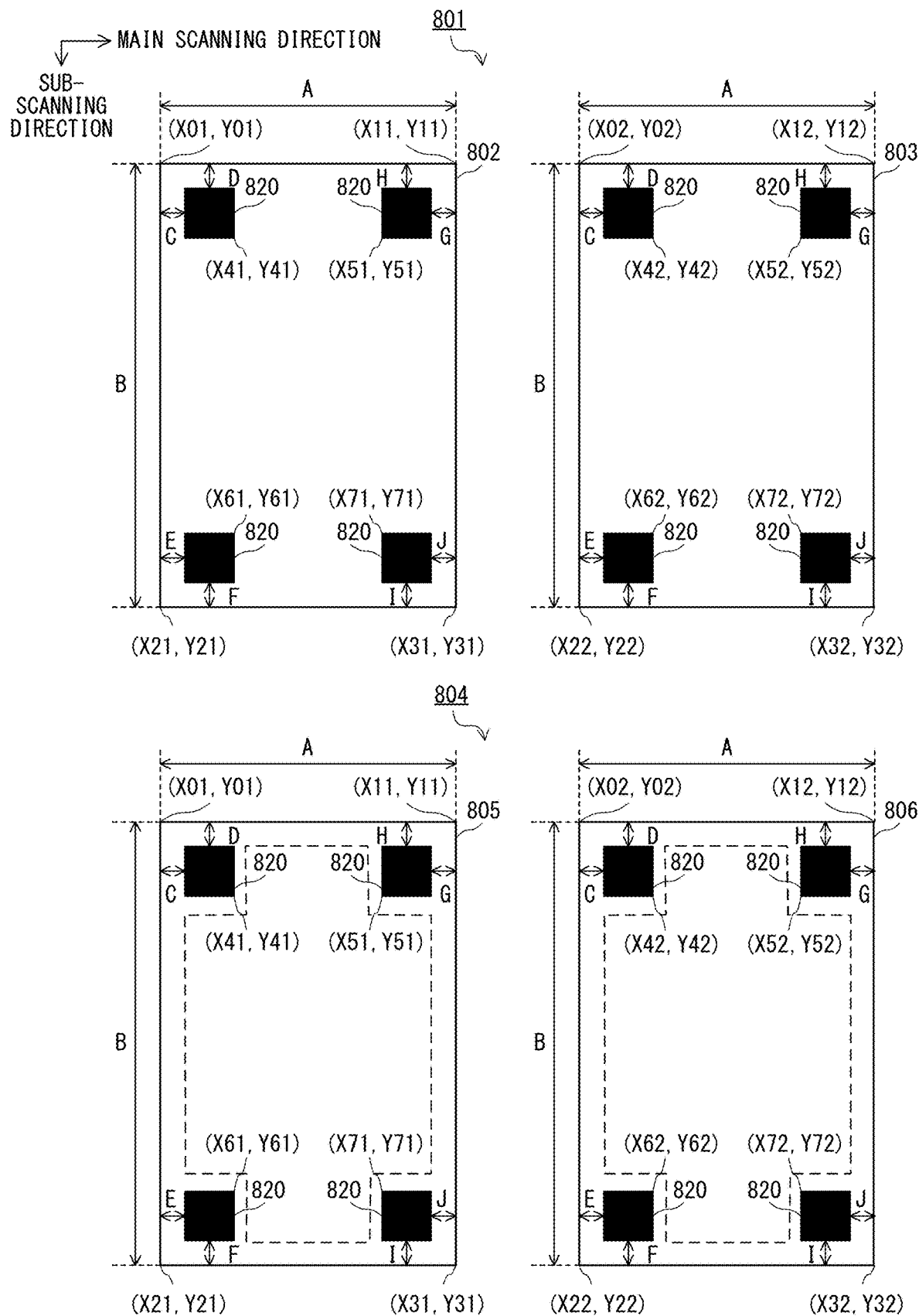
FIG. 8 is an exemplary view of the adjustment sheet.

In the case of the interruption adjustment, an adjustment sheet 801 illustrated as an example in FIG. 8 is used for adjusting the geometric characteristic. Therefore, the adjustment sheet 801 is created every time a periodic condition is satisfied (every time the number of passed sheets 110 reaches the predetermined number). The predetermined number of sheets being the condition for periodically creating the adjustment sheet 801 is determined based on, for example, user instruction information. The user instruction information is information relating to the periodic condition for periodically creating the adjustment sheet 801 The printer controller 103 acquires the user instruction information input from the operation panel 180, and determines the predetermined number of sheets based on the user instruction information. In adjusting the geometric characteristic at the time of the real time adjustment, an adjustment sheet 804 illustrated as an example in FIG. 8 is used. In the adjustment sheet 804, a test image as shown in FIG. 5 is formed on both sides of a sheet 110 with a user image.

The printer controller 103 displays a list screen 1001 for print jobs illustrated as an example in FIG. 7A on the operation panel 180 based on the print jobs stored in the print job library 700. The user uses the operation panel 180 to select an "ADJUST PRINTING POSITION" button 1002 on the list screen 1001. Thus, the printer controller 103 displays a printing position adjustment screen illustrated as an example in FIG. 7B on the operation panel 180.

The user uses the operation panel 180 to put a check on an item "ADJUST BY READING AN ADJUSTMENT SHEET EVERY PREDETERMINED NUMBER OF SHEETS" 1105 on the printing position adjustment screen. Thus, the user can instruct interruption adjustment to the printer controller 103. By instructing the interruption adjustment, the printer controller 103 instructs the engine control unit 312 to form an adjustment sheet for front/back registration. The engine control unit 312 creates an adjustment sheet 801 for each predetermined number of sheets in accordance with this instruction.

The user uses the operation panel 180 to put a check on an item "ADJUST BY CONSTANTLY READING AN ADJUSTMENT SHEET" 1106 on the printing position adjustment screen. Thus, the user can instruct real time adjustment to the printer controller 103. By instructing the real time adjustment, the printer controller 103 instructs the engine control unit 312 to form an adjustment sheet for front/back registration. The engine control unit 312 add the patch image 820 to the user image to create an adjustment sheet 801 in accordance with this instruction.

In the adjustment sheet 801 illustrated as an example in FIG. 8, the test image 802 formed of four patch images 820 as illustrated as an example in FIG. 4 is formed on the front surface and back surface of the sheet 110. The adjustment sheet 801 is delivered from the printer 100 to the adjustment unit 400.

The reading unit 500 of the adjustment unit 400 continuously reads the patch images 820 on both sides line by line by the reading sensors C1 and C2 while the adjustment sheet 801 is being conveyed by the conveyance rollers 501, 502, and 503. The image processing part 260 acquires reading results for each line from the reading sensors C1 and C2 and joins the reading results, to thereby generate read images on both sides of the adjustment sheet 801.

From the read image of the front surface (test image 802) of the adjustment sheet 801, the image processing part 260 detects vertex coordinates (X01, Y01), (X11, Y11), (X21, Y21), and (X31, Y31) of the sheet and coordinates (X41, Y41), (X51, Y51), (X61, Y61), and (X71, Y71) of the patch images 820. From the read image of the back surface (test image 803) of the adjustment sheet 801, the image processing part 260 detects vertex coordinates (X02, Y02), (X12, Y12), (X22, Y22), and (X32, Y32) of the sheet and coordinates (X42, Y42), (X52, Y52), (X62, Y62), and (X72, Y72) of the patch images 820.

The image processing part 260 measures, for example, a distortion amount of the image on the front surface and the print misregistration based on the detected vertex coordinates (X01, Y01), (X11, Y11), (X21, Y21), and (X31, Y31) and the detected coordinates (X41, Y41), (X51, Y51), (X61, Y61), and (X71, Y71). The image processing part 260 measures, for example, a distortion amount of the image on the back surface and the print misregistration based on the detected vertex coordinates (X02, Y02), (X12, Y12), (X22, Y22), and (X32, Y32) and the detected coordinates (X42, Y42), (X52, Y52), (X62, Y62), and (X72, Y72). The image processing part 260 also measures the print misregistration on the front and back surfaces based on each of the printing positions on the front surface and the back surface.

The image processing part 260 derives geometric adjustment values for each of the front surface and the back surface, which enable the shape of the image to be corrected by the image shape correction unit 320, based on measurement results of, for example, the distortion amount of the image, the print misregistration, and the print misregistration on the front and back surfaces. The geometric adjustment values include parameters, for example, a leading position, a side position, a magnification, perpendicularity, and a rotation amount. The geometric adjustment values for the front surface and the back surface derived by the image processing part 260 are transmitted to the sheet library 900 of the printer controller 103 through the communication unit 250. The sheet library 900 stores the acquired geometric adjustment values for the front surface and the back surface as the parameters to be used at the time of image formation for the front surface and for the back surface. The geometric adjustment values are derived for each type of the sheet 110 and stored in the sheet library 900.

Similar to the adjustment sheet 801, which is used at the time of the interruption adjustment, the adjustment sheet 804, which is used at the time of real time adjustment, is also read by the reading unit 500. The image processing part 260 derives the geometric adjustment value from the reading result of the adjustment sheet 804, which is used at the time of real time adjustment. The method of deriving the geometric adjustment value at the time of real time adjustment is the same as that at the time of interruption adjustment. This geometric adjustment value is also derived for each type of the sheet 110 and stored in the sheet library 900.

The adjustment sheet 801 read by the reading sensors C1 and C2 at the time of the interruption adjustment is discharged to the fixed tray 431 via the discharge path 432. The adjustment sheet 804 at the time of real time adjustment read by the reading sensors C1 and C2 is delivered to the finisher 600 via the through-path 430.

The image shape correction unit 320 transmits the image data adjusted based on the geometric adjustment values to the engine control unit 312. The engine control unit 312 forms images on the sheet 110 based on the adjusted image data. The images formed in this manner are formed on both sides of the sheet 110 while the image position, distortion, and other geometrical characteristics have been adjusted with high-precision front/back registration.

Through the updating of the geometric adjustment values, the geometric characteristics of the images formed on the sheet 110 are maintained with high precision and optimally. In this embodiment, the geometric adjustment values are updated not only at a predetermined timing in the middle of the print job but also before the start of the print job. That is, the adjustment sheet 801 is created before the start of the print job as well as created by interrupting the print job in the middle thereof.

<Front/Back Registration>

Figure 9:
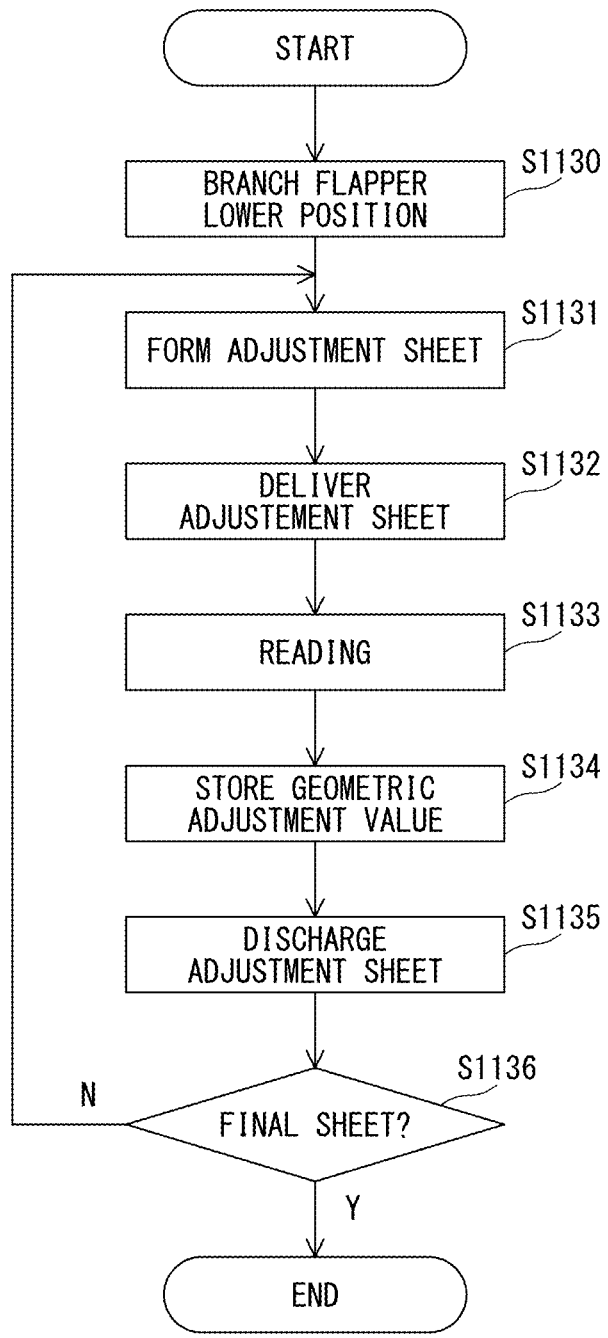
FIG. 9 is a flow chart for illustrating front/back registration processing for the interruption adjustment.
Figure 10:
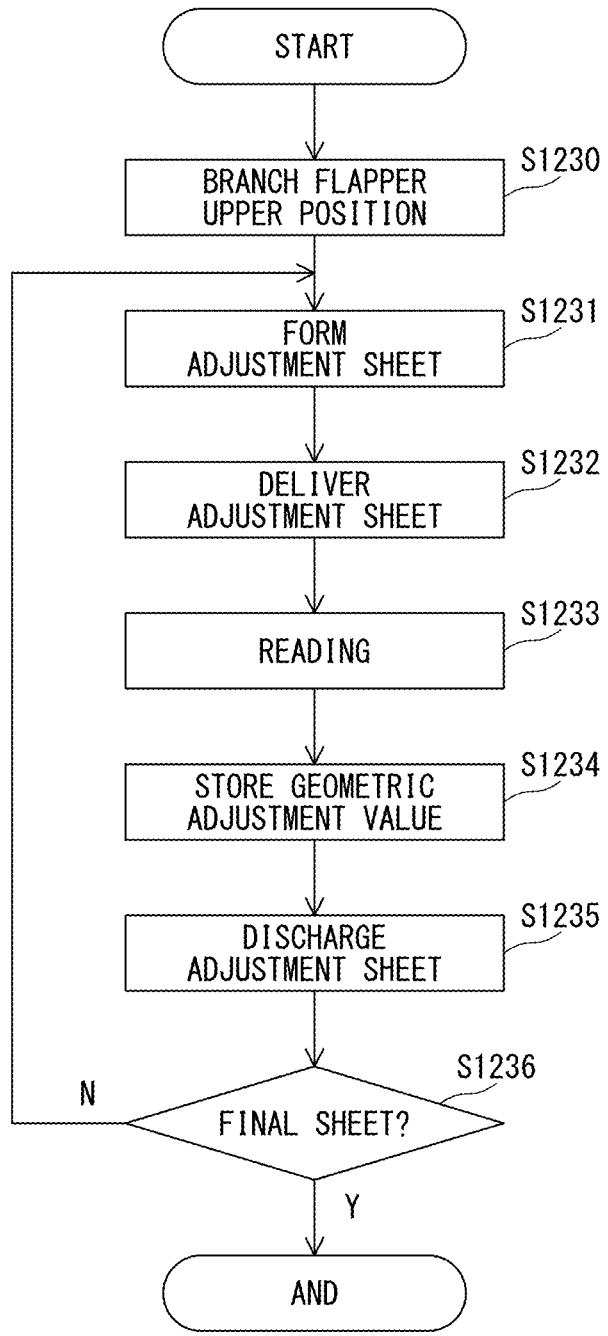
FIG. 10 is a flowchart for representing front/back registration processing in a real time adjustment.
Figure 11A:
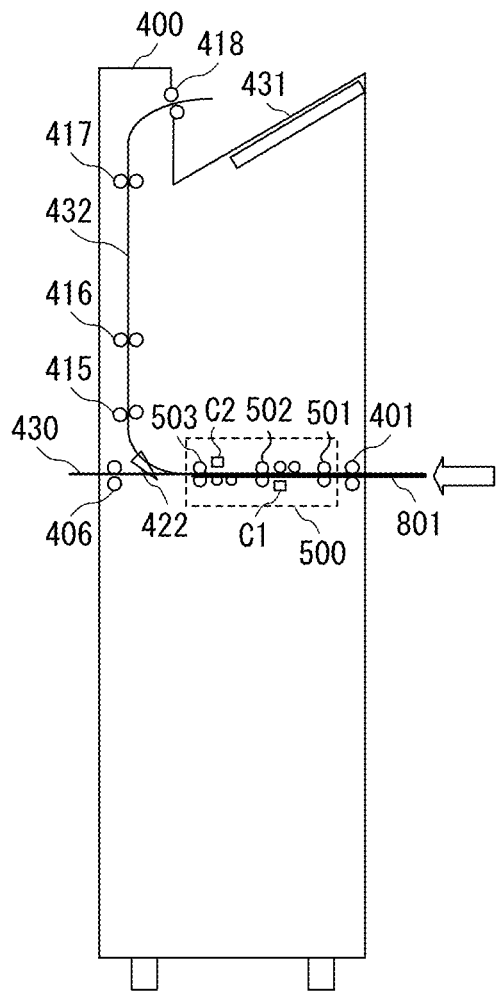
FIG. 11A and FIG. 11B are explanatory views of a position of the adjustment sheet in the adjustment unit.
Figure 11B:
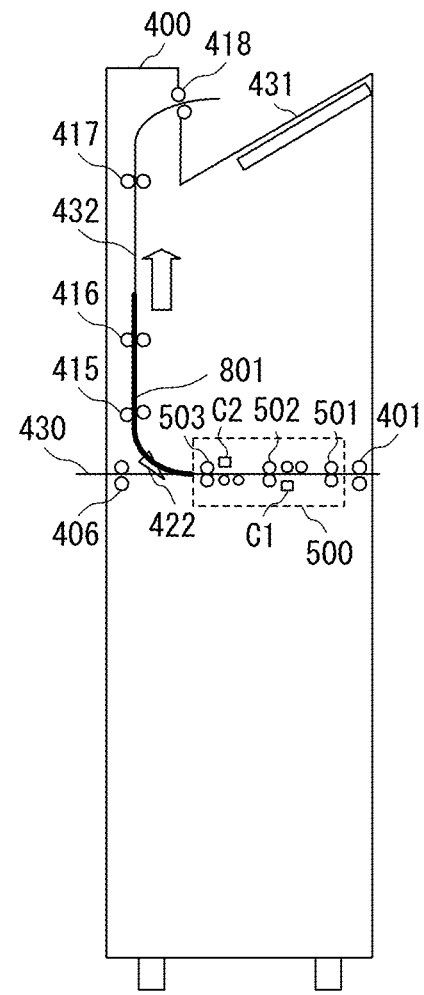
Figure 12A:
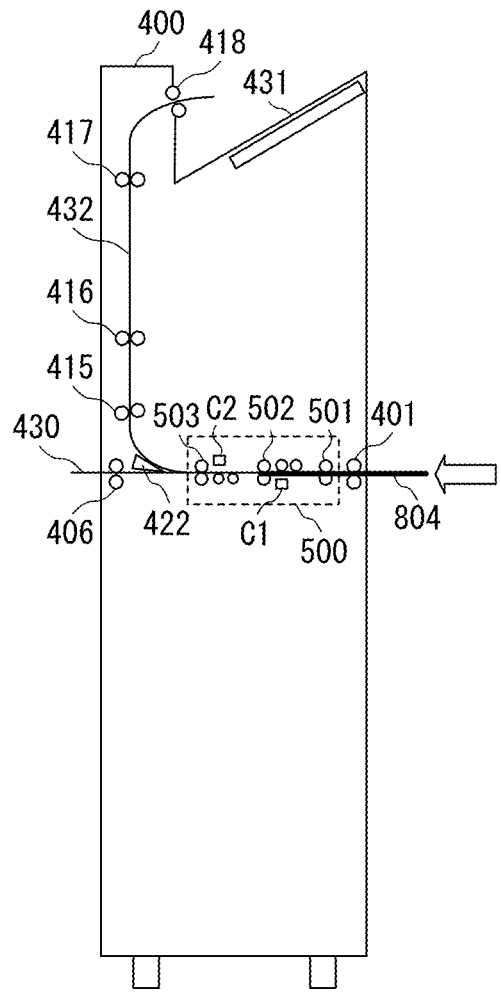
FIG. 12A and FIG. 12B are explanatory views of a position of a job sheet in the adjustment unit.
Figure 12B:
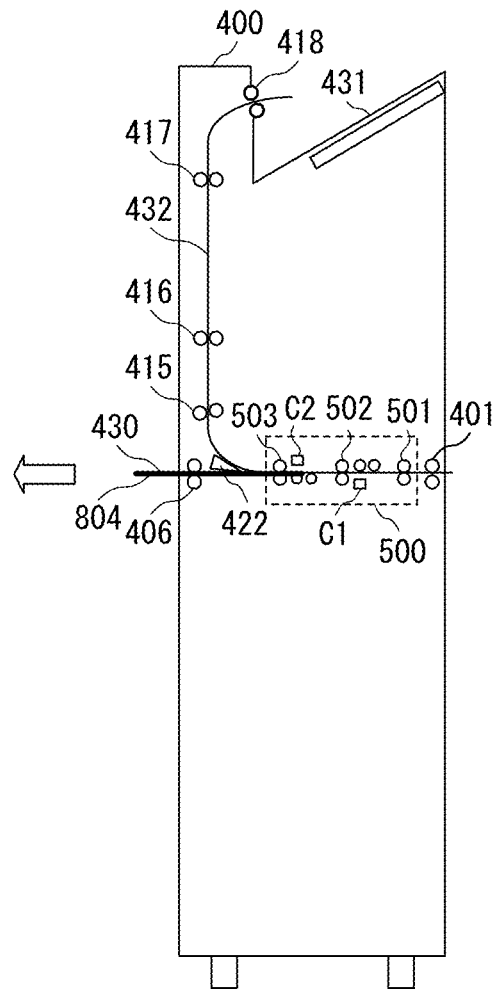

FIG. 9 is a flow chart for illustrating front/back registration processing to be performed at the time of the interruption adjustment by the image forming apparatus 1. FIG. 10 is a flow chart for illustrating front/back registration processing to be performed at the time of the real time adjustment by the image forming apparatus 1. FIG. 11A and FIG. 11B are explanatory views of the position of the adjustment sheet 801 in the adjustment unit 400 at the time of the interruption adjustment. FIG. 12A and FIG. 12B are explanatory views of the position of the adjustment sheet 804 in the adjustment unit 400 at the time of the real time adjustment. The image forming apparatus 1 receives a print job and starts processing. When the "ADJUST PRINTING POSITION" button 1002 on the list screen 1001 of FIG. 7A is selected, the image forming apparatus 1 performs the front/back registration by the interruption adjustment or the real time adjustment.

The process in the interruption adjustment is explained. The branch flapper 422 included in the adjustment unit 400 has been moved to the lower position in order to guide the sheet 110 to the discharge path 432 (Step S1130). The printer controller 103 selects the type of sheet for which the front/back registration is to be performed based on the print job being executed. The printer controller 103 instructs the engine control unit 312 to create the adjustment sheet 801. When the engine control unit 312 receives this instruction, the engine control unit 312 forms the test images 802 and 803 on the front and back surfaces of the sheet 110 to form the adjustment sheet 801 (Step S1131). The printer 100 delivers the created adjustment sheet 801 to the adjustment unit 400 (Step S1132). FIG. 11A represents how the adjustment sheet 801 is delivered from the printer 100 to the adjustment unit 400.

The control unit 251 of the adjustment unit 400 causes the conveyance motors M401 to M405 to drive the conveyance rollers 401, 501, 502, and 503 to convey the adjustment sheet 801. Thus, the adjustment sheet 801 passes through the reading position of the reading unit 500. While the adjustment sheet 801 is passing through the reading position of the reading unit 500, the reading sensors C1 and C2 read the test images 802 and 803 formed on both sides (Step S1133). At that time, the control unit 251 starts to read and measure the back surface of the adjustment sheet 801 by the reading sensor C1 after a predetermined time period has elapsed since a timing at which the sheet detection sensor 521 detected the leading edge portion of the adjustment sheet 801. The control unit 251 also starts to read and measure the front surface of the adjustment sheet 801 by the reading sensor C2 after a predetermined time period has elapsed since a timing at which the sheet detection sensor 522 detected the leading edge portion of the adjustment sheet 801.

As described above, the image processing part 260 derives geometric adjustment values based on the reading results of the adjustment sheet 801 obtained by the reading sensors C1 and C2, and stores the geometric adjustment values in the sheet library 900 (Step S1134). By deriving the geometric adjustment values, the printing position adjustment for the front/back registration is completed. When the printing position adjustment is completed, the control unit 251 causes the conveyance motors M401 to M405 to drive the conveyance rollers 415, 416, and 417 and the discharge rollers 418 to discharge the adjustment sheet 801 to the fixed tray 431 (Step S1135). FIG. 11B represents how the adjustment sheet 801 is conveyed through the discharge path 432 by the conveyance rollers 415, 416, and 417 and the discharge rollers 418.

When the sheet 110 (job sheet) or the adjustment sheet 801 is discharged, the printer controller 103 determines whether or not the image forming processing has been completed on the final sheet (Step S1136). When the image forming processing has not been completed on the final sheet (N in Step S1136), the image forming apparatus 1 repeatedly performs the processing step of Step S1002 and the subsequent steps. When the image forming processing on the final sheet has been completed (Y in Step S1136), the image forming apparatus 1 ends the front/back registration processing.

The process in the real time adjustment will be explained. The branch flapper 422 included in the adjustment unit 400 has been moved to the upper position in order to guide the sheet 110 to the through-path 430 (Step S1230). The printer controller 103 instructs the engine control unit 312 to create the adjustment sheet 804. When the engine control unit 312 receives this instruction, the engine control unit 312 forms the user image and the test images 802 and 803 on the sheet 110, respectively (Step S1231). The printer 100 delivers the created adjustment sheet 804 to the adjustment unit 400 (Step S1232). FIG. 12A represents how the adjustment sheet 804 is delivered from the printer 100 to the adjustment unit 400.

The control unit 251 of the adjustment unit 400 causes the conveyance motors M401 to M405 to drive the conveyance rollers 401, 501, 502, and 503 to convey the adjustment sheet 804. Thus, the adjustment sheet 804 passes through the reading position of the reading unit 500. While the adjustment sheet 804 is passing through the reading position of the reading unit 500, the reading sensors C1 and C2 read the test images 805 and 806 formed on both sides (Step S1233). At that time, the control unit 251 starts to read and measure the back surface of the adjustment sheet 804 by the reading sensor C1 after a predetermined time period has elapsed since the timing at which the sheet detection sensor 521 detected the leading edge portion of the adjustment sheet 804. The control unit 251 also starts to read and measure the front surface of the adjustment sheet 804 by the reading sensor C2 after a predetermined time period has elapsed since a timing at which the sheet detection sensor 522 detected the leading edge portion of the adjustment sheet 804.

As described above, the image processing part 260 derives geometric adjustment values based on the reading results of the adjustment sheet 804 obtained by the reading sensors C1 and C2, and stores the geometric adjustment values in the sheet library 900 (Step S1234). By deriving the geometric adjustment values, the printing position adjustment for the front/back registration is completed. When the printing position adjustment is completed, the control unit 251 causes the conveyance motors M401 to M405 to drive the discharge rollers 406 to discharge the adjustment sheet 804 to the finisher 600 (Step S1235). FIG. 12B represents how the adjustment sheet 804 is conveyed by the discharge rollers 406 to the finisher 600. The finisher 600 discharges the adjustment sheet 804 to the tray 601 or the tray 602.

When the adjustment sheet 804 is discharged, the printer controller 103 determines whether or not the image forming processing has been completed on the final sheet (Step S1236). When the image forming processing has not been completed on the final sheet (N in Step S1236), the image forming apparatus 1 repeatedly performs the processing step of S1002 and the subsequent steps. When the image forming processing on the final sheet has been completed (Yin Step S1236), the image forming apparatus 1 ends the front/back registration processing.

<Detection of Erroneous Detection of Test Image>

The image forming apparatus 1 of the present embodiment reads the adjustment sheets 801 and 804 using the reading unit 500 provided in-line to automatically adjust the geometric characteristics. In the case of the interrupt adjustment, the image forming apparatus 1 creates the adjustment sheet 801 every time the predetermined number of job sheets are created to adjust the geometric characteristics. In the real time adjustment, the image forming apparatus 1 adjusts, with the adjustment sheet 804 on which the test images 805 and 806 are added to the user image, the geometric characteristics every time the user image is formed.

Figure 13:
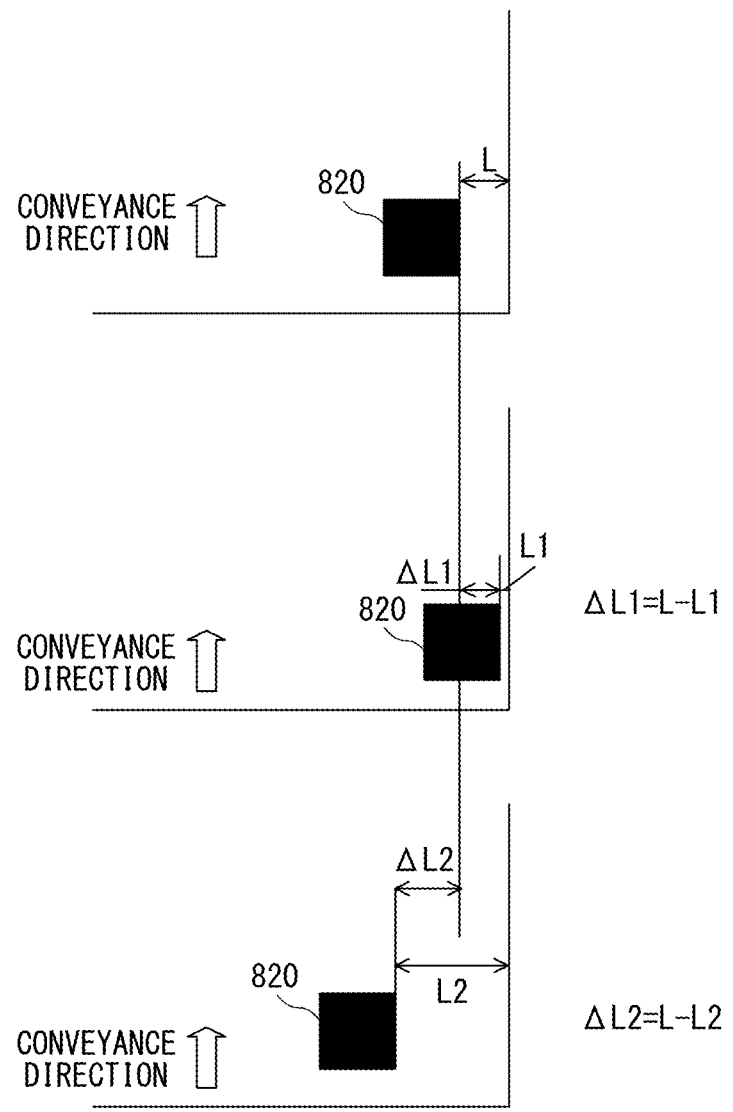
FIG. 13 is an explanatory view of erroneous detection in the test image.

FIG. 13 is an explanatory view of erroneous detection in the test image. As described above, in a case where the patch image 820 is printed in the normal position, the distance from the edge portion of the sheet 110 to the patch image 820 is referred to as L. In a case where the patch image 820 is printed on the edge portion of the sheet 110 at a position close to a predetermined distance, the distance from the edge portion of the sheet 110 to the patch image 820 is referred to as L1. In this case, the deviation of the print position from the normal position is as follows: $\Delta L1 = L - L1$. In a case where the patch image 820 is printed on the edge portion of the sheet 110 at a position away from a predetermined distance, the distance from the edge portion of the sheet 110 to the patch image 820 is referred to as L2. In this case, the deviation of the print position from the normal position is as follows: $\Delta L2 = L - L2$. Hereinafter, $\Delta L1$ and $\Delta L2$, which are deviations in the print position, are set as threshold values for identifying the erroneous detections in the test image. The threshold value $\Delta L1$ is a threshold value for determining abnormal data in a case where the print position shifts to the edge portion of the sheet. The threshold value $\Delta L2$ is a threshold value for determining abnormal data in a case where the print position shifts away from the edge portion of the sheet.

The image processing part 260 measures the distance from the edge portion of the sheet to the patch image 820 based on the reading results of the adjustment sheets 801 and 804 (patch image 820) by the reading sensors C1 and C2. The image processing part 260 calculates a difference $\Delta L$, which is a difference between a measured distance from the edge portion of the sheet to the patch image 820 and a distance from the edge portion of the sheet to the patch image 820 in a case where the patch image 820 is formed at the normal position. The image processing part 260 compares the difference $\Delta L$ with the threshold values $\Delta L1$ and $\Delta L2$. As a result of the comparison, in a case where $|\Delta L1| < \Delta L$ or $|\Delta L2| < \Delta L$, the image processing part 260 determines that the reading result is erroneously detected (abnormal data), and determines to not use this reading result for the calculation of the geometric adjustment value. That is, as to the reading result in which the difference $\Delta L$ is larger than the threshold value $\Delta L1$ or the threshold value $\Delta L2$, the reading result is excluded from samples for calculating the geometric adjustment value. Thereby the accuracy of the geometric adjustment values is prevented from deteriorating due to the sudden occurrence of abnormal data. Here, it is assumed that the erroneous detections occur under the following conditions.

- Erroneous detection of the patch image due to the surface properties of the sheet 110 (embossed paper, label paper, etc.): In a case where the surface of the sheet 110 is uneven, the print position of the patch image may not be measured correctly.
- Erroneous detection due to changes in the sheet size caused by cutting variations, etc.: Margins may become minimum/maximum due to changes in the sheet shape at the time of conveying the sheet, thereby the edge portion of the sheet may not be accurately acquired, resulting in the erroneous detection.
- Erroneous detection due to image defects (black streaks, white streaks) caused by dust etc., at the reading position of the reading unit 500: Due to image defects (black streaks, white streaks), the white streaks may be determined to be the edge portion of the sheet, or it may be determined that the edge portion of the sheet is missing due to the black streaks.

<Calculation Method of Geometric Adjustment Value>

Figure 14:
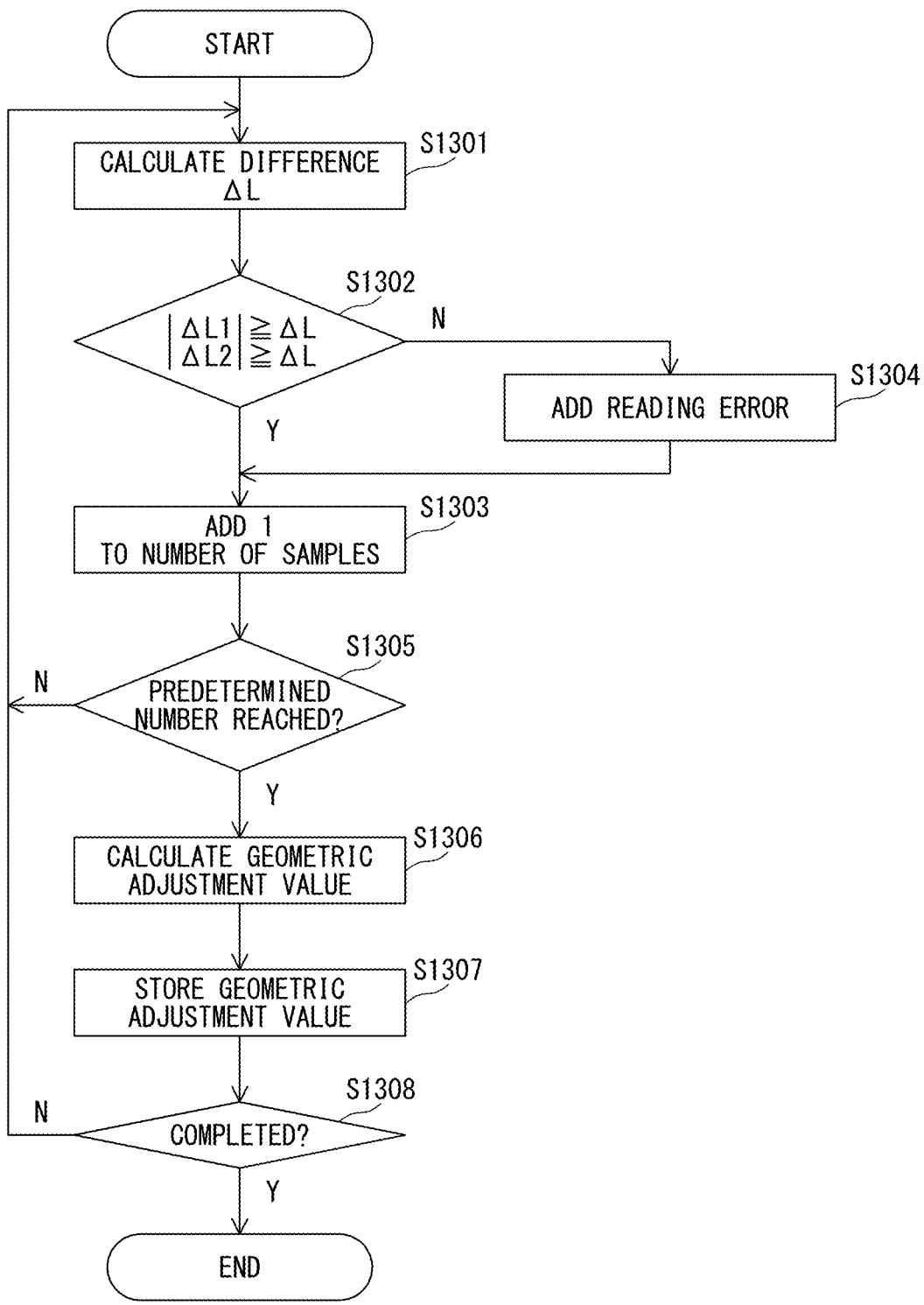
FIG. 14 is a flowchart representing calculation processing of a geometric adjustment value at the time of interruption adjustment.

FIG. 14 is a flowchart representing calculation processing of the geometric adjustment value at the time of interruption adjustment. This processing is the processing of Step S1134 in FIG. 9.

The image processing part 260 measures the distance from the edge portion of the sheet 110 to the patch image 820 based on the reading result of the adjustment sheets 801. The image processing part 260 calculates a difference ΔL, which is a difference between the measurement result and the distance from the edge portion of the sheet to the patch image 820 in a case where the patch image 820 is formed at the normal position (Step S1301). The image processing part 260 compares the calculated difference ΔL with the threshold values ΔL1 and ΔL2 (Step S1302). In a case where the difference ΔL is larger than the threshold values ΔL1 and ΔL2 (Step S1302: N), the image processing part 260 adds information representing the erroneous detection to the reading result (Step S1304). After adding the information representing the erroneous detection to the reading result, the image processing part 260 adds 1 to the number of samples of the reading result (Step S1303). In a case where the difference ΔL is smaller than the threshold value ΔL1 and the threshold value ΔL2 (Step S1302: Y), the image processing part 260 adds 1 to the number of samples of the reading result (Step S1303). The image processing part 260 repeats the processing of Steps S1301 to S1304 until the number of samples of the reading result reaches a predetermined specified value (specified number of sheets) (Step S1305: N). Here, the specified number when performing the interruption adjustment is, for example, three.

In a case where the number of samples of the reading result reaches the specified value (specified number of sheets) (Step S1305: Y), the image processing part 260 calculates the geometric adjustment value based on the reading result to which the information representing the erroneous detection is not added (Step S1306). The image processing part 260 calculates, for example, an average geometric adjustment value from the reading result to which the information representing the erroneous detection is not added. In this case, the geometric adjustment value is the average geometric adjustment value calculated from the specified number of the reading results. The image processing part 260 stores the calculated geometric adjustment value in the sheet library 900 (Step S1307). The printer controller 103 adjusts the print position of the image by affine transformation or the like based on the geometric adjustment value stored in the sheet library 900. The image processing part 260 repeats the processing of Steps S1301 to S1307 until the job is completed (Step S1308: N). After completion of the job (Step S1308: Y), the image processing part 260 ends the calculation processing of the geometric adjustment value at the time of interruption adjustment. In this processing, the number of samples of the reading result used for calculating the geometric adjustment value is reduced.

Figure 15:
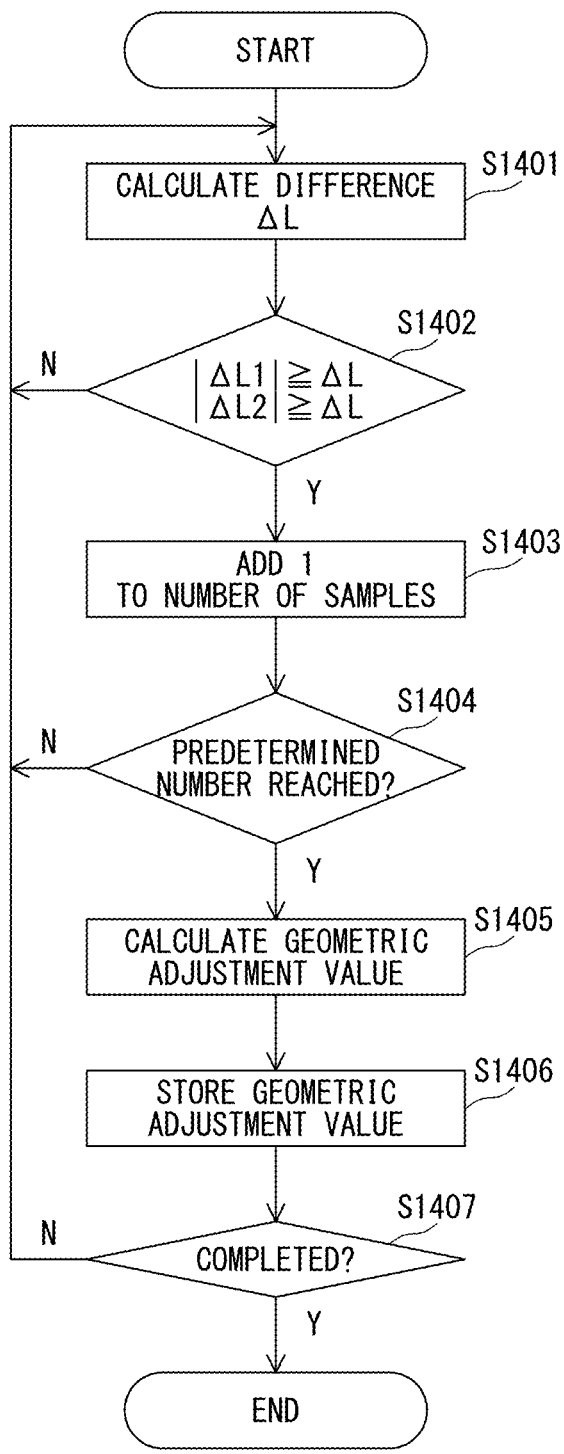
FIG. 15 is a flowchart representing calculation processing of a geometric adjustment value at the time of real-time adjustment.

FIG. 15 is a flowchart representing calculation processing of the geometric adjustment value at the time of real time adjustment. This processing is the processing of Step S1234 in FIG. 10.

The image processing part 260 measures the distance from the edge portion of the sheet 110 to the patch image 820 based on the reading result of the adjustment sheets 801. The image processing part 260 calculates a difference ΔL, which is a difference between the measurement result and the distance from the edge portion of the sheet to the patch image 820 in a case where the patch image 820 is formed at the normal position (Step S1401). The image processing part 260 compares the calculated difference ΔL with the threshold values ΔL1 and ΔL2 (Step S1402). In a case where the difference ΔL is larger than the threshold values ΔL1 and ΔL2 (Step S1402: N), the image processing part 260 discards the reading result and returns to the calculation processing of the difference ΔL of Step S1401. In a case where the difference ΔL is smaller than the threshold value ΔL1 and the threshold value ΔL2 (Step S1402: Y), the image processing part 260 adds 1 to the number of samples of the reading result (Step S1403). The image processing part 260 repeats the processing of Steps S1401 to S1403 until the number of samples of the reading result reaches a predetermined specified value (Step S1404: N). Here, the specified number when performing the real time adjustment is, for example, five. In the real time adjustment, the adjustment sheet 801 can always be read. Therefore, the precision of the geometric adjustment value is improved by increasing the specified number at the time of the real time adjustment to be larger than the specified number at the time of the interruption adjustment. On the other hand, in the interruption adjustment, the opportunity to read the adjustment sheet 801 is less than that in the real time adjustment. Therefore, in order not to decrease a frequency of updating the geometric adjustment value, the specified number at the time of real time adjustment is smaller than that in the interruption adjustment.

In a case where the number of samples of the reading result reaches the specified value (Step S1404: Y), the image processing part 260 calculates the geometric adjustment value based on the specified number of the reading result (Step S1405). The image processing part 260 stores the calculated geometric adjustment value in the sheet library 900 (Step S1406). The printer controller 103 adjusts the print position of the image by affine transformation or the like based on the geometric adjustment value stored in the sheet library 900. The image processing part 260 repeats the processing of Steps S1401 to S1406 until the job is completed (Step S1407: N). After completion of the job (Step S1407: Y), the image processing part 260 ends the calculation processing of the geometric adjustment value at the time of interruption adjustment. In this processing, the number of the samples of the reading result is not reduced, and the number of the samples of the reading result used for calculating the geometric adjustment value is maintained at the specified number. Therefore, the accuracy of the geometric adjustment value is stabilized.

<Method of Searching Edge Portion of Sheet and Patch Image>

Figure 16:
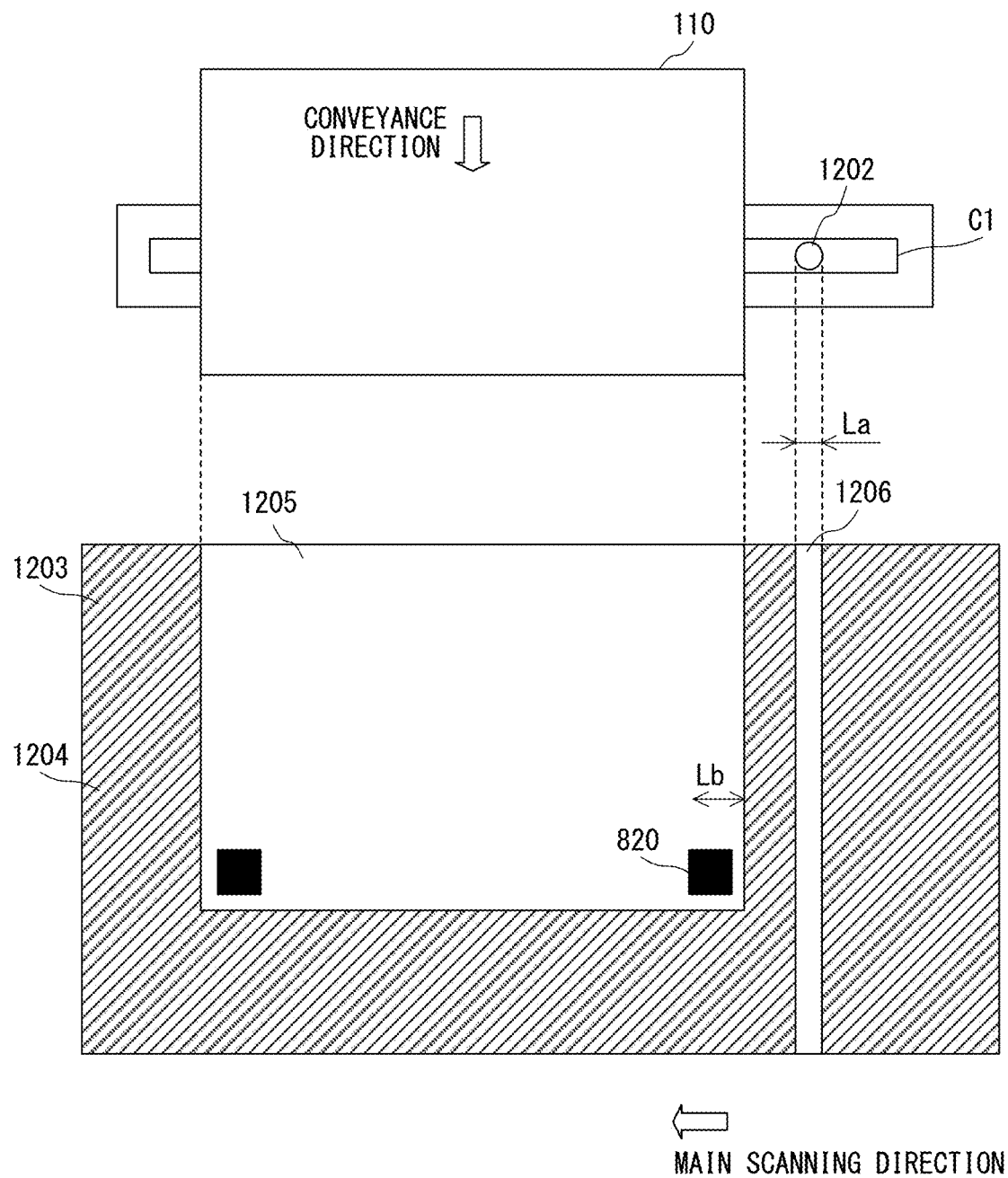
FIG. 16 is an explanatory diagram of a method for searching an edge portion of the sheet and a patch image.

FIG. 16 is an explanatory diagram of a method of searching an edge portion of the sheet and a patch image. Hereinafter, a reading result by the reading sensor C1 will be described, however, even in the reading sensor C2, the searching for the edge portion of the sheet and the patch image 820 is performed in the same manner.

The reading sensor C1 reads the conveyed sheet 110 (adjustment sheet). The reading image 1203 is the reading result of the reading sensor C1. The reading image 1203 contains a black background image 1204 which is a background, and an image 1205 of the sheet 110. The image processing part 260 determines a change in the black and white color of the reading image 1203 for each pixel in order in the main scanning direction, and, in a case where a width Lb of white color of a predetermined length is detected, the image processing part 260 detects a pixel at the start position of the width Lb as the edge portion of the sheet 110. That is, since the background image 1204 is black, based on the fact that white pixels continue in the main scanning direction by a predetermined number of pixels (width Lb) from a pixel at a position where the color changes from black to white, the image processing part 260 determines the pixel at a position where the color changes from black to white as the edge portion of the sheet 110.

After detecting the edge portion of the sheet 110, the image processing part 260 searches for an edge portion of the patch image 820. The image processing part 260 determines the change in black and white color from the edge portion of the sheet 110 of the reading image 1203 in order for each pixel in the main scanning direction, and detects the position where the color changes from white to black as the edge portion of the patch image 820. The image processing part 260 calculates the distance L from the edge portion of the sheet 110 to the patch image 820.

In a case where the dust 1202 adheres to the reading position of the reading sensor C1, a white streak image 1206 occurs in the reading image 1203. The length of the streak image in the main scanning direction is defined as a dust width La. The dust width La is an assumed width of the streak image 1206 due to the dust 1202. From the distance L and the white width Lb of a predetermined length, an assumed variation amount is set as ΔL'(L−Lb). Preferably, the predetermined width Lb is larger than the dust width La (Lb>La). This is because when the predetermined width Lb is smaller than the dust width La (Lb<La), the streak image 1206 may be erroneously recognized as the edge portion of the sheet 110.

As described above, when adjusting geometric characteristics during a job, the image forming apparatus 1 of the present embodiment selects reading results so as not to include extemporaneous abnormal data at the time of reading the test image. Specifically, the image forming apparatus 1 excludes reading results outside a range, which is defined by the threshold value, from the adjustment of geometric characteristics. Further, the image forming apparatus 1 calculates the geometric adjustment value in a case where the number of samples of the reading result reaches the specified value. Therefore, the image forming apparatus 1 can adjust the geometric characteristics with high accuracy while preventing a decrease in the number of samples. As described above, the present invention can suppress a decrease in the adjustment accuracy of the geometric characteristics due to a decrease in the number of samples.

The image forming apparatus 1 of the present embodiment described above has a configuration in which the reading sensors C1 and C2 are provided in the adjustment unit 400. However, the reading sensors C1 and C2 may be provided in the printer 100. For example, the reading sensors C1 and C2 may be provided in the conveyance path 135. In this case, in the printer 100, a tray is provided at a rear end of the reverse path 136. The printer 100 discharges the adjustment sheet 801 used for the interruption adjustment to the tray, and discharges the adjustment sheet 804 used for the real time adjustment from the discharge path 139.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-050582, filed Mar. 24, 2021, which is hereby incorporated by reference herein in its entirety.

What is claimed is:

1. An image forming apparatus comprising:
an image forming unit configured to form an image on a sheet;
a conveyance unit configured to convey the sheet having the image formed thereon to a conveyance path;
a reading unit configured to read a test image of a sheet conveyed to the conveyance path; and
a controller configured to:
determine an adjustment value for adjusting a geometric characteristic of an image to be formed by the image forming unit based on a reading result of the reading unit;
control the image forming unit to form the test image;
control the reading unit to read the sheet having the test image formed thereon;
determine an adjustment value for adjusting a geometric characteristic of an image to be formed by the image forming unit based on a reading result of the reading unit;
control the geometric characteristic of the image formed by the image forming unit based on the adjustment value,
wherein the controller is also configured to:
determine abnormal data from the reading result of the reading unit, and
determine the adjustment value based on a specified number of the reading results except for the reading result determined to be the abnormal data.

2. The image forming apparatus according to claim 1, wherein the controller is configured to:
detect a position of the test image from the reading result; and
determine the reading result to be the abnormal data in a case where a difference between a normal position and a position detected by the controller is larger than a predetermined threshold value.

3. The image forming apparatus according to claim 1, wherein the controller is configured to:
measure a distance from an edge portion of the sheet to the test image based on the reading result,
calculate, based on a measured distance, a difference between a normal position and a position of the test image read by the reading unit; and
determine the reading result as the abnormal data in a case where the difference is larger than each of a first predetermined threshold value and a second predetermined threshold value.

4. The image forming apparatus according to claim 3, wherein the first threshold value is a threshold value for determining abnormal data in a case where the position of the test image shifts to a side to the edge portion of the sheet; and
wherein the second threshold value is a threshold value for determining abnormal data in a case where the position of the test image shifts to a side opposite to the edge portion of the sheet.

5. The image forming apparatus according to claim 3, wherein the controller is configured to:
determine a color change for each pixel in a predetermined direction for the reading result; and
detect a pixel at a start position, which is a position at which the color of the pixel is changed, as the edge portion of the sheet in a case where a predetermined number of pixels having a changed color are continuously detected, and wherein a length corresponding to the number of pixels is longer than a length of a streak image expected to occur in the reading result in the predetermined direction.

6. The image forming apparatus according to claim 1, wherein the image forming unit is configured to form the test image and an image instructed by a print job on the sheet.

7. The image forming apparatus according to claim 6, wherein the image forming unit is configured to form only the test image on the sheet;

wherein the controller is configured to:
  determine abnormal data from the reading result of the reading unit; and
  determine the adjustment value based on the reading results except for the reading result determined to be the abnormal data in a case where the number of the sheet read by the reading unit reaches the specified number.

8. The image forming apparatus according to claim 7, wherein the image forming unit is configured to interrupt, every time the number of sheets on which image forming is performed according to the print job reaches a predetermined number, the print job to form only the test image on the sheet.

9. An image forming apparatus comprising:
an image forming unit configured to form an image and a test image on a sheet, the test image including a position detection image;
a conveyance unit configured to convey the sheet having the image and the test image formed thereon by the image forming unit;
a reading unit configured to read the test image on the sheet downstream, in the conveyance direction in which the conveyance unit conveys the sheet, of the image forming unit;
a controller configured to:
  acquire reading results of the test images formed by the image forming unit on a plurality of sheets, with the reading results being output from the reading unit;
  determine a sheet having the test image positioned within a predetermined range based on the reading results; and
  generate an adjustment condition for adjusting a geometric characteristic of an image to be formed by the image forming unit based on reading results of a first number of sheets having the test images positioned within the predetermined range,
wherein the image forming unit controls the geometric characteristic of the image formed on a sheet following the plurality of sheets based on the adjustment condition.

10. The image forming apparatus according to claim 9, wherein the image and the test image are formed on the same sheet.

11. The image forming apparatus according to claim 9, wherein the controller is configured to perform a first mode in which both the image and the test image are formed on the sheet and a second mode in which the test image is formed on other sheets that are different from the sheet on which the image is formed, wherein the controller is configured to generate, in a case where the first mode is performed, the adjustment condition based on reading results of the first number of sheets that have the test images positioned within the predetermined range, and wherein the controller is configured to generate, in a case where the second mode is performed, the adjustment condition based on reading results obtained by excluding reading results of the other sheets that have the test images positioned outside the predetermined range from the reading results of a second number of the other sheets.

12. The image forming apparatus according to claim 11, wherein the image forming unit is configured to form, in the second mode, the test image on the second number of the other sheets each time images are formed on a predetermined number of sheets.

13. The image forming apparatus according to claim 12, wherein the predetermined number is determined based on user instruction information related to the number of the sheets on which the test image is formed.

14. The image forming apparatus according to claim 9, wherein the controller is configured to compare a distance from an edge portion of the sheet to the test image and a threshold value to determine whether the test image is positioned within the predetermined range based on a comparison result of the distance and the threshold value.

15. The image forming apparatus according to claim 9, wherein the position detection image is formed in corner areas of the sheet.

16. The image forming apparatus according to claim 9, wherein the geometric characteristic includes a position of the image formed on the sheet.

17. The image forming apparatus according to claim 9, wherein the geometric characteristic includes a shape of the image formed on the sheet.

18. The image forming apparatus according to claim 9, wherein the adjustment condition is stored corresponding to the type of the sheet.

19. The image forming apparatus according to claim 9, wherein the test image is formed on both sides of the sheet.

20. The image forming apparatus according to claim 19, wherein the adjustment condition includes an adjustment condition for a front surface of the sheet an adjustment condition for back surface, which is a back-side surface of the front surface, of the sheet.

* * * * *